(12) United States Patent
Shon et al.

(10) Patent No.: US 9,343,732 B2
(45) Date of Patent: May 17, 2016

(54) ELECTRODE ACTIVE MATERIAL, ELECTRODE COMPRISING THE SAME, LITHIUM BATTERY COMPRISING THE ELECTRODE, AND METHOD OF PREPARING THE ELECTRODE ACTIVE MATERIAL

(75) Inventors: Jeong-kuk Shon, Cheonan-si (KR); Jae-man Choi, Hwaseong-si (KR); Seung-sik Hwang, Seongnam-si (KR); Moon-seok Kwon, Hwaseong-si (KR); Min-sang Song, Seongnam-si (KR); Myung-hoon Kim, Seoul (KR); Ji-man Kim, Suwon-si (KR); Gwi-ok Park, Pyeongtaek-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 13/548,746

(22) Filed: Jul. 13, 2012

(65) Prior Publication Data

US 2013/0078517 A1    Mar. 28, 2013

(30) Foreign Application Priority Data

Sep. 23, 2011 (KR) .......... 10-2011-0096374
Jun. 18, 2012 (KR) .......... 10-2012-0065166

(51) Int. Cl.
*H01M 4/04* (2006.01)
*H01M 4/131* (2010.01)
(Continued)

(52) U.S. Cl.
CPC ............ *H01M 4/0471* (2013.01); *H01M 4/131* (2013.01); *H01M 4/133* (2013.01); *H01M 4/134* (2013.01); *H01M 4/1391* (2013.01);

*H01M 4/364* (2013.01); *H01M 4/366* (2013.01); *H01M 4/485* (2013.01); *H01M 4/587* (2013.01); *H01M 10/0525* (2013.01); *H01M 4/48* (2013.01);
(Continued)

(58) Field of Classification Search
CPC .......... H01M 4/00; H01M 4/02; H01M 4/36; H01M 4/48; H01M 4/96
USPC ............ 429/231.8, 223, 231, 224, 231.5, 122
See application file for complete search history.

(56) References Cited

U.S. PATENT DOCUMENTS

2004/0234859 A1    11/2004    Lee et al.
2006/0234127 A1    10/2006    Kim et al.

FOREIGN PATENT DOCUMENTS

KR    10-2011-0004500    1/2011
KR    10-2011-0035003    4/2011
(Continued)

OTHER PUBLICATIONS

Sugnaux (EP 1207572) (a raw machine translation) (Abstract and Detailed Description) (May 22, 2002).*
(Continued)

*Primary Examiner* — Patrick Ryan
*Assistant Examiner* — Carmen Lyles-Irving
(74) *Attorney, Agent, or Firm* — Cantor Colburn LLP

(57) ABSTRACT

An electrode active material, an electrode including the electrode active material, a lithium battery including the electrode, and a method of preparing the electrode active material. The electrode active material includes a core having at least one of a metal or a metal oxide that enables intercalation and deintercalation of lithium ions and a crystalline carbon thin film that is formed on at least a portion of a surface of the core. The electrode active material has a nano-structure.

18 Claims, 20 Drawing Sheets

(51) Int. Cl.

| | | |
|---|---|---|
| *H01M 4/133* | (2010.01) | |
| *H01M 4/134* | (2010.01) | |
| *H01M 4/1391* | (2010.01) | |
| *H01M 4/36* | (2006.01) | |
| *H01M 4/485* | (2010.01) | |
| *H01M 4/587* | (2010.01) | |
| *H01M 10/0525* | (2010.01) | |
| *H01M 4/48* | (2010.01) | |
| *H01M 4/58* | (2010.01) | |
| *H01M 4/02* | (2006.01) | |

(52) U.S. Cl.
CPC ....... *H01M4/5825* (2013.01); *H01M 2004/021* (2013.01); *H01M 2004/028* (2013.01); *Y02E 60/122* (2013.01); *Y02P 70/54* (2015.11)

(56) References Cited

FOREIGN PATENT DOCUMENTS

| KR | 10-2011-0036447 | | 4/2011 |
|---|---|---|---|
| WO | 2004049473 | A2 | 6/2004 |

OTHER PUBLICATIONS

Yuan, et al., Nano-structured SnO2—carbon composites obtained by in situ spray pyrolysis method as anodes in lithium batteries, Journal of Power Sources 146 (2005) pp. 180-184.

Extended European Search Report for Application No. 12181559.1-2119 dated Dec. 18, 2012.

Xiaoxu Ji et al., "Carbon-Coated SnO2 Nanorod Array for Lithium-Ion Battery Anode Material," Nanoscale Res Lett, vol. 5, 2010, p. 649-653.

Hirotomo Nishihara et al., "Carbon-coated mesoporous silica with hydrophobicity and electrical conductivity," Carbon, vol. 46, 2008, p. 48-53.

Taeri Kwon et al., "Carbon-coated mesoporous silica as an electrode material," Microporous and Mesoporous Materials, vol. 132, 2010, p. 421-427.

Mijung Noh et al., "Amorphous Carbon-Coated Tin Anode Material for Lithium Secondary Battery," Chem. Mater, vol. 17, 2005, p. 1926-1929.

\* cited by examiner

EXAMPLE 3

EXAMPLE 3

EXAMPLE 4

EXAMPLE 4

COMPARATIVE EXAMPLE 8

EXAMPLE 9

ELECTRODE ACTIVE MATERIAL, ELECTRODE COMPRISING THE SAME, LITHIUM BATTERY COMPRISING THE ELECTRODE, AND METHOD OF PREPARING THE ELECTRODE ACTIVE MATERIAL

CROSS-REFERENCE TO RELATED APPLICATION

This application claims the benefit of Korean Patent Applications Nos. 10-2011-0096374, filed on Sep. 23, 2011 and 10-2012-0065166, filed on Jun. 18, 2012, in the Korean Intellectual Property Office, the disclosure of which is incorporated herein in its entirety by reference.

BACKGROUND OF THE INVENTION

1. Field of the Invention

Aspects of the present disclosure relate to electrode active materials, electrodes including the electrode active materials, lithium batteries including the electrodes, and methods of preparing the electrode active materials.

2. Description of the Related Art

A representative example of a negative active material that is used in an electrochemical cell including a battery, such as a lithium battery, is a carbonaceous material such as graphite. Graphite has excellent capacity maintenance characteristics and potential characteristics, and when alloyed with lithium, the graphite volume does not change. Accordingly, a battery that is manufactured using graphite has high stability. However, graphite has a limitation as a high-capacity battery material, which limitation is recently being reached.

Also, as the negative active material, a metal that is alloyable with lithium can be used. Examples of a metal that are alloyable with lithium are silicon (Si), tin (Sn), aluminum (Al) etc. Such metals have relatively large electric capacity. However, during charge and discharge, the metals expand in volume and thus some active materials in an electrode may be shorted and the short may result in a substantial decrease in maintenance of capacity in a battery.

Accordingly, the need is gradually increasing for development of a negative active material and battery with improved performance embodying both high capacity and long-lifetime battery.

SUMMARY OF THE INVENTION

Aspects of the present invention provide electrode active materials having novel structures.

Aspects of the present invention provide electrodes including the electrode active materials.

Aspects of the present invention provide lithium batteries including the electrodes.

Aspects of the present invention provide methods of preparing the electrode active materials.

An aspect of the present invention provides an electrode active material including a core comprising at least one of a metal and a metal oxide that enable intercalation and deintercalation of lithium ions; and a crystalline carbon thin film that is formed on at least a portion of a surface of the core, and the electrode active material has a nano-structure.

Another aspect of the present invention provides an electrode including the electrode active material.

Another aspect of the present invention provides a lithium battery including the electrode.

In another aspect of the present invention, a method of preparing the electrode active material includes: forming a carbon-based moiety represented by Formula 2 below on at least a portion of a surface of a core including at least one of a metal and a metal oxide that enable intercalation and deintercalation of lithium ions, the method including mixing i) the core, ii) a carbon-based precursor represented by Formula 1 below, and iii) a solvent; and converting the carbon-based moiety into a crystalline carbon thin film by heating in an inert atmosphere the core on which the carbon-based moiety is formed:

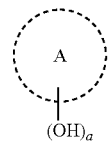

<Formula 1>

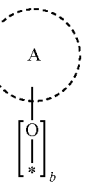

<Formula 2> in Formulae 1 and 2, the ring A is a substituted or unsubstituted $C_5$-$C_{30}$ aromatic ring or a substituted or unsubstituted $C_2$-$C_{30}$ heteroaromatic ring;

a and b are each independently an integer of 1 to 5; and

* denotes a binding site with the surface of the core.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1A:
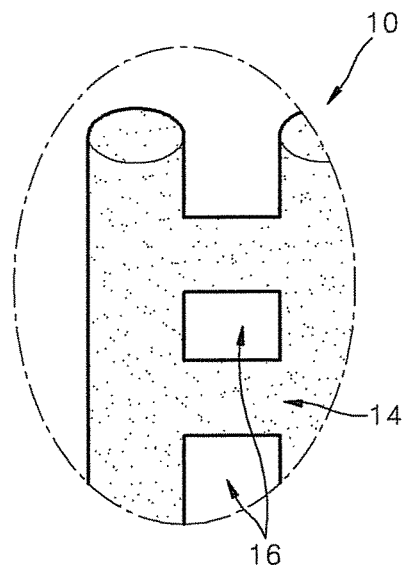
FIG. 1A is a schematic view of a portion of an electrode active material according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, electrode active materials, electrodes including the electrode active materials, lithium batteries and capacitors including the electrodes, and methods of preparing the electrode active materials according to exemplary embodiments of the present invention will be described in detail.

An electrode active material according to an embodiment of the present invention includes a core including at least one of a metal and a metal oxide that enable intercalation and deintercalation of lithium ions; a crystalline carbon thin film that is formed on at least a portion of a surface of the core, and the electrode active material may have a nano-structure.

The electrode active material having a nano-structure may be in the form of a particle, rod, wire, or tube. Also, the electrode active material having a nano-structure may have pores and a skeleton that forms a wall between adjacent pores.

The expression "electrode active material having a nano-structure" means that at least one of the dimensions of the electrode active material has a nano size (of 100 nm or less, for example, in a range of about 1 nm to about 80 nm, or in a range of about 5 nm to about 50 nm). For example, if the electrode active material having a nano-structure is in the form of a particle, the average size of the electrode active material having a nano-structure may have the nano-sizes as described above. Also, if the electrode active material having a nano-structure is in the form of a particle and includes a pore and a skeleton that forms a wall between adjacent pores, the average size of the particle, the average size of pores, and the thickness of the skeleton may have the nano-sizes as described above.

Due to the nano-structure of the electrode active material, lithium ions may be smoothly intercalated into and deintercalated from the electrode active material. Also, the electrode active material may be uniformly dispersed in an electrode including the electrode active material. Accordingly, an electrode including the electrode active material having a nano-structure may have improved electrical characteristics.

If the electrode active material includes a pore and a skeleton that forms a wall between adjacent pores, the pore may have a uniform shape and distribution. Thus, the electrode active material may have an ordered porosity. The pore size and the skeleton thickness may have nano sizes as described above.

If the electrode active material includes pores, the electrode active material may easily tolerate stress caused by volumetric expansion during charge and discharge. Also, due to the pores, the electrode active material has a very large specific area and thus, the contact area between the electrode active material and the electrolyte may be increased. Herein, if the skeleton thickness is a nano-size (for example, 10 nm or less), the diffusion path of lithium ions in the skeleton may be reduced and thus high-rate characteristics may be improved.

The electrode active material may include the pores and skeleton as described above. In the case of nano particles that have the same size as that of the skeleton, a resistance may occur between the particles. However, if the electrode active material includes the pores and the skeleton as described above, because the skeleton of the electrode active material has a network structure, resistance may decrease and thus power loss may decrease. Also, because pores of the electrode active material are orderly arranged, an electrochemical reaction may uniformly occur and thus a local loss or deterioration of the electrode active material may be preventable.

The core included in the electrode active material may include at least one of a metal and a metal oxide that enable intercalation and deintercalation of lithium ions. To dehydrate with a carbon-based precursor of Formula 1, the metal and the metal oxide may each include an element having a surface to which a hydroxyl group is bondable. The carbon-based precursor of Formula 1 will be described below.

The metal may include at least one of tin (Sn), iron (Fe), cobalt (Co), nickel (Ni), zinc (Zn), manganese (Mn), molybdenum (Mo), and bismuth (Bi), and the metal oxide may include at least one of tin oxide, iron oxide, cobalt oxide, nickel oxide, zinc oxide, manganese oxide, molybdenum oxide, and bismuth oxide. The core may be an alloy or oxide composite that includes different kinds of metal, and the core may form a composite with lithium.

For example, the core may include at least one of $SnO_2$ and $MoO_2$, but is not limited thereto.

The crystalline carbon thin film may be formed on at least a portion of the surface of the core to improve rate characteristics and conductivity of the electrode active material. Also, the crystalline carbon thin film may function as a resistor against a volumetric change of the core during charge and discharge of the electrode active material to reduce any physical structural change of the electrode active material. Accordingly, lifetime characteristics of a lithium battery including an electrode including the electrode active material may have improved lifetime characteristics.

The thickness of the crystalline carbon thin film may be 2 nm or less, for example, about 0.1 nm to about 2 nm. According to an embodiment of the present invention, the thickness of the crystalline carbon thin film may be 1 nm or less, for example, in a range of about 0.1 nm to about 1 nm, but is not limited thereto.

At least a portion of the crystalline carbon thin film may include a single- or multi-graphene layer. "Graphene" refers to an allotrope or form of carbon that consists of carbon atoms that are bonded by $sp^2$ bonding to form a two-dimensional atomic planar structure. Accordingly, the thickness of the single graphene layer may be substantially the same as a diameter of a carbon atom. The multi-graphene layer refers to a layer that includes a plurality of graphene layers stacking in a direction perpendicular to the direction in which carbon atoms of one graphene layer extend. The multi-graphene layer may be a layer formed by stacking two to ten, for example, two to five graphene sheets. Accordingly, the thickness of the crystalline carbon thin film may be one to ten times, or one to five times, or one to two times, greater than the diameter of a carbon atom, but is not limited thereto.

Due to excellent crystallinity, the crystalline carbon thin film may improve conductivity of the electrode active material. For example, regarding a Raman spectrum of the crystalline carbon thin film, the peak intensity ratio of $I_D/I_G$ may be 0.7 or less, for example, 0.65 or less, wherein $I_D$ represents the intensity of peak D that is present at a wave number of $1360\pm10\ cm^{-1}$ and $I_G$ represents the intensity of peak G that is present at a wave number of $1580\pm10\ cm^{-1}$. The peak D shows a disorder or defect of the carbon thin film and the peak G shows an $sp^2$ bond which is a graphite bond of the crystalline carbon thin film. If the value $I_D/I_G$ of the crystalline carbon thin film satisfies the ranges described above, the crystalline carbon thin film may have excellent crystallinity, and thus, conductivity of the electrode active material may be increased.

Accordingly, at 31.83 Mpa, the electrode active material may have a conductivity of about $2.0\times10^{-5}$ S/cm to about $1.0\times10^{-2}$ S/cm, for example, about $7.1\times10^{-4}$ S/cm to about $1.0\times10^{-3}$ S/cm. As described above, the electrode active material has such a range of conductivity while maintaining the nano-structure, and thus is useful in a lithium battery. The conductivity may be obtained by, for example, using a carbon-based precursor of Formula 1, which will be described below, as a carbon thin film source.

When A represents the specific surface area of the core and B represents the mass of the carbon thin film, B/A may be $7.69\times10^{-3}\ g^2/m^2$ or less (in a case of an active material that includes 10 graphene layers as the carbon thin film and the core having a specific surface area of $100\ m^2/g$), for example, about $5.0\times10^{-4}\ g^2/m^2$ to about $2.0\times10^{-4}\ g^2/m^2$. The B/A value may be obtainable because the carbon thin film has a micro/nano and uniform thickness of, for example, 1 to 10 times greater than the carbon atom diameter. For reference, theoretically, the specific surface area of one graphene layer is $2600\ m^2/g$ and if the graphene layer is completely coated, the B/A value may be $7.69\times10^{-4}\ g^2/m^2$.

Figure 1B:
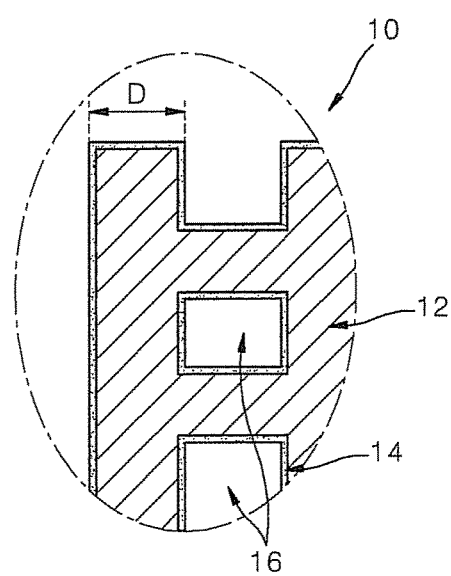
FIG. 1B is a schematic cross-sectional view of the electrode active material of FIG. 1A.

The electrode active material has the nano-structure and the carbon thin film described above. FIG. 1A is a schematic enlarged view of a portion of an electrode active material 10 according to an embodiment of the present invention, wherein the electrode active material 10 includes a pore 16 and a skeleton that forms a wall between adjacent pores 16, and FIG. 1B is a schematic sectional view of the electrode active material 10 of FIG. 1A. The electrode active material 10 includes a core 12 and a carbon thin film 14, and the carbon thin film 14 may be formed on at least a portion of the surface of the core 12. For example, the carbon thin film 14 may be formed on an exposed surface of the core 12 and an inner wall of the pore 16.

The pore 16 of the electrode active material 10 may have a bimodal size distribution. Due to the bimodal size distribution of the pore 16, a stress that may occur due to an expansion rate difference caused by an inner structure difference of the electrode active material (for example, core 12) during charge and discharge may be easily tolerated. The bimodal size distribution of the pore 16 may be confirmed by appearance of two pore diameter peaks in a Barrett-Joyner-Halenda (BJH) pore size distribution graph obtained by a nitrogen adsorption test.

The bimodal size distribution graph of the pore 16 may have a first peak that is present in a range of about 1 nm to about 5 nm and a second peak that is present in a range of about 10 nm to about 20 nm. For example, the pore may have a first peak that is present in a range of about 2 nm to about 5 nm and a second peak that is present in a range of about 16 nm to about 20 nm. That is, the electrode active material 10 may include first ordered nano-pores having a size of less than 10 nm and second ordered nano-pores having a size of more than 10 nm.

The electrode active material 10 may have an ordered mesoporous structure. The detailed order of the pore 16 of the electrode active material 10 may be confirmed in view of a peak that appear in a low angle X-ray diffraction spectrum.

In a low angle X-ray diffraction spectrum, a peak of the electrode active material 10 with respect to a (110) plane, may appear at 2θ of 0.6±0.2°.

For example, the electrode active material 10 may have, in a low angle X-ray diffraction spectrum, a typical meso structure of Tetragonal $14_1/a$ (or a sub-structure thereof). This shows that the electrode active material 10 has a highly ordered three-dimensional pore structure and skeleton structure. In particular, a diffraction peak with respect to the (110) plane may be related to a pore corresponding to the second peak in the bimodal size distribution of the pore 16. That is, if a peak corresponding to the second peak is present in the bimodal size distribution of the pore 16, a peak corresponding to the (110) plane is also present in the low angle X-ray diffraction spectrum.

The thickness (D) of the skeleton that forms a wall between adjacent pores 16 of the electrode active material 10 may be about 5 nm or more. For example, the thickness (D) of the skeleton may be in a range of about 5 nm to about 20 nm. For example, the thickness (D) of the skeleton may be in a range of about 5 nm to about 10 nm. For example, the thickness (D) of the skeleton may be in a range of about 10 nm to about 20 nm. For example, the thickness (D) of the skeleton may be in a range of about 10 nm to about 15 nm. If the thickness of the skeleton (D) is within the ranges described above, crystallization of the core 12 may effectively occur.

The crystal size of the core 12 of the electrode active material 10 may be 5 nm or more. For example, the crystal size of the core 12 of the electrode active material 10 may be in a range of about 5 nm to about 30 nm.

The specific surface area of the electrode active material 10 may be in a range of about 50 $m^2/g$ to about 250 $m^2/g$. For example, the specific surface area of the electrode active material 10 may be in a range of about 100 $m^2/g$ to about 150 m²/g. Due to having such ranges of the specific surface area, the electrode active material 10 may contribute to electrical performance improvement of a lithium battery, a capacitor, or the like. The specific surface area may be adjusted by controlling the size of the pore 16 or the size (or thickness) of the skeleton (D). When the electrode active material 10 has such specific surface area ranges, a flow or diffusion path of lithium ions with respect to the electrode active material 10 may be easily obtained, and stability of the electrode active material 10 may be secured.

The volume of the pore 16 of the electrode active material 10 may be in a range of about 0.1 cm³/g to about 2 cm³/g. For example, the volume of the pore 16 of the electrode active material 10 may be in a range of about 0.5 cm³/g to about 1 cm³/g. When the volume of the pore 16 is within the ranges described above, the electrode active material 10 may contribute to an electrical performance improvement of a lithium battery, a capacitor, or the like. The pore volume may be adjusted by controlling the size of the pore 16 or the size (or thickness) of the skeleton (D). When the volume of the pore 16 is within the ranges described above, a flow or diffusion path of lithium ions with respect to the electrode active material 10 may be easily obtained, and stability of the electrode active material 10 may be secured.

The pores 16 of the electrode active material 10 may be connected to each other to form a channel. Due to the formation of the channel, an electrolyte may easily permeate into the electrode active material 10 and lithium ions may easily move.

The term "the surface of the core" in "crystalline carbon thin film formed on at least a portion of the surface of the core" may include, when the core includes pores and a skeleton that forms a wall between adjacent pores, an inner wall of the pore.

The porosity of the electrode active material 10 may be 80% or less. For example, the porosity of the electrode active material 10 may be in a range of about 10% to about 70%. The porosity refers to a ratio of a volume of the pore 16 to the whole volume of the electrode active material 10. When the porosity is within the ranges described above, the electrode active material 10 may have excellent lifetime characteristics and energy density.

The electrode active material may be included in an electrode, for example, an electrode for a lithium battery. Accordingly, an electrode including the electrode active material may be provided. The electrode may be a positive or negative electrode for a lithium battery. For example, the electrode may be a negative electrode for a lithium battery.

A method of manufacturing the negative electrode for a lithium battery will now be described in detail. The electrode active material, a conducting agent, a binder, and a solvent may be mixed to prepare a negative active material composition, and the prepared negative active material composition may be directly coated on a copper current collector to manufacture a negative electrode plate. Alternatively, the prepared negative active material composition may be cast onto a separate support and a negative active material film separated from the separate support may be laminated on a copper current collector to a negative electrode plate.

Examples of the conducting agent may be carbon black, graphite particles, natural graphite, artificial graphite, acetylene black, carbon fiber; carbon nanotube; metal powder or metal fiber or metal tube of copper, nickel, aluminum, silver, or the like; and a conductive polymer such as a polyphenylene derivative. However, the conducting agent is not limited thereto, and may be any one of various materials that are used as a conducting agent in the art.

Examples of the binder are a vinylidene fluoride/hexafluoropropylene copolymer, polyvinylidenefluoride, polyacrylonitrile, polymethylmethacrylate, polytetrafluoroethylene (PTFE), a mixture of the forgoing polymers, and a styrene butadiene rubber-based polymer. Examples of the solvent are N-methylpyrrolidone (NMP), acetone, and water. The binder and the solvent are not limited to these materials and may be any of various materials that are used in the art.

According to an embodiment, the negative active material composition may further include a plasticizer to form pores in an electrode plate.

Amounts of the negative active material, the conducting agent, the binder, and the solvent may be at the same levels as conventionally used in a lithium battery. According to the purpose and structure of a lithium battery, one or more of the conducting agent, the binder, and the solvent may be omitted.

Also, the negative active material may further include, in addition to the electrode active material, a conventional negative active material. The conventional negative active material may be any one of various materials that are used as a negative active material for a lithium battery in the art. For example, the conventional negative active material may include at least one material selected from the group consisting of lithium metal, a metal that is alloyable with lithium, a transition metal oxide, a non-transition metal oxide, and a carbonaceous material.

For example, the metal that is alloyable with lithium may be Si, Sn, Al, Ge, Pb, Bi, Sb, an Si—X alloy where X is an alkali metal, an alkali earth metal, a Group 13 element, a Group 14 element, a transition metal, a rare earth element, or a combination thereof and is not silicon (Si), Sn-T alloy where T is an alkali metal, an alkali earth metal, a rare earth element, a Group 14 element, a transition metal, a rare earth element, or a combination thereof and is not tin (Sn), or the like. The elements X or T may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be lithium titanium oxide, vanadium oxide, lithium vanadium oxide, or the like.

For example, the non-transition metal oxide may be $SnO_2$, $SiO_x(0<x<2)$, or the like.

The carbonaceous material may be crystalline carbon, amorphous carbon, or a mixture thereof. The crystalline carbon may be a natural or artificial graphite of a shapeless, plate, flake, sphere, or fiber type. The amorphous carbon may be soft carbon (low-temperature calcined carbon), hard carbon, a mesophase pitch carbide, calcined coke, or the like.

Also, the negative electrode may be used, in addition to a lithium battery, in other electrochemical cells, such as a super capacitor. In this case, the manufacturing method, the electrode composition, the electrode structure, or the like may be appropriately modified except for the use of the negative active material described above.

For example, an electrode for a capacitor may be manufactured by coating the negative active material on a metal structure that has been disposed on a conductive substrate. Alternatively, the negative active material may be directly coated on a conductive substrate to manufacture an electrode for a capacitor.

Like the negative electrode, a positive electrode including the electrode active material may also be manufactured by using any of various materials that are conventionally used in a positive electrode for a lithium battery and a method that is similar to the method described above.

A lithium battery according to an embodiment of the present invention includes a positive or negative electrode that includes the electrode active material. For example, the lithium battery may include a negative electrode including the electrode active material. An example of a method of manufacturing the lithium battery will now be described in detail.

First, a negative electrode including the electrode active material may be manufactured as described above according to an embodiment of the present invention.

Then, a positive electrode may be manufactured as follows. The positive electrode may be manufactured in the same manner as used to manufacture the negative electrode, except that a positive active material is used instead of the negative active material.

A positive active material composition may include the conducting agent, the binder, and the solvent which have been used in preparing the negative electrode. A positive active material, a conducting agent, a binder, and a solvent may be mixed to prepare a positive active material composition. The positive active material composition may be coated directly on an aluminum current collector and dried to manufacture a positive electrode plate including a positive active material layer. Alternatively, the positive active material composition may be cast onto a separate support and a film separated from the separate support may be laminated on an aluminum current collector to manufacture a positive electrode plate including a positive active material layer.

The positive active material may be any one of various lithium-containing metal oxides that are conventionally used in the art. For example, the positive active material may include at least one composite oxide of lithium and metal selected from the group consisting of cobalt, manganese, nickel, and a combination thereof. A detailed example of the positive active material may be a compound represented by any one of various formulae including $Li_aA_{1-b}L_bD_2$ where $0.90 \leq a \leq 1.8$ and $0 \leq b \leq 0.5$; $Li_aE_{1-b}L_bO_{2-c}D_c$ where $0.90 \leq a \leq 1.8$, $0 \leq b \leq 0.5$, and $0 \leq c \leq 0.05$; $LiE_{2-b}L_bO_{4-c}D_c$ where $0 \leq b \leq 0.5$ and $0 \leq c \leq 0.05$; $Li_aNi_{1-b-c}Co_bL_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bL_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Co_bL_cO_{2-\alpha}R_2$ where $0.90 \leq a \leq 1.8$, $0 \leq b \leq 0.5$, $0 \leq c \leq 0.05$, and $0 < \alpha < 2$; $Li_aNi_{1-b-c}Mn_bL_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bL_cO_{2-\alpha}R_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bL_cO_{2-\alpha}R_2$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$, and $0.001 \leq b \leq 0.1$; $Li_aCoG_bO_2$ where $0.90 \leq a \leq 1.8$, and $0.001 \leq b \leq 0.1$; $Li_aMnG_bO_2$ where $0.90 \leq a \leq 1.8$, and $0.001 \leq b \leq 0.1$; $Li_aMn_2G_bO_4$ where $0.90 \leq a \leq 1.8$, and $0.001 \leq b \leq 0.1$; $QO_2$; $QS_2$; $LiQS_2$; $V_2O_5$; $LiV_2O_5$; $LiZO_2$; $LiNiVO_4$; $Li_{(3-f)}J_2(PO_4)_3$ $(0 \leq f \leq 2)$; $Li_{(3-f)}Fe_2(PO_4)_3$ $(0 \leq f \leq 2)$; and $LiFePO_4$.

In these formulae, A is Ni, Co, Mn, or a combination thereof; L is Al, Ni, Co, Mn, Cr, Fe, Mg, Sr, V, a rare earth element, or a combination thereof; D is O, F, S, P, or a combination thereof; E is Co, Mn, or a combination thereof; R is F, S, P, or a combination thereof; G is Al, Cr, Mn, Fe, Mg, La, Ce, Sr, V, or a combination thereof; Q is Ti, Mo, Mn, or a combination thereof; Z is Cr, V, Fe, Sc, Y, or a combination thereof; and J is V, Cr, Mn, Co, Ni, Cu, or a combination thereof.

For example, $LiCoO_2$, $LiMn_xO_{2x}(x=1, 2)$, $LiNi_{1-x}Mn_xO_{2x}$ $(0 < x < 1)$, $Ni_{1-x-y}Co_xMn_yO_2$ $(0 \leq x \leq 0.5, 0 \leq y \leq 0.5)$, $LiFePO_4$, or the like may be used.

A coating layer may be further formed on these compounds, or a mixture of these compounds and a compound having a coating layer is also used. The coating layer may be an oxide of a coating element, a hydroxide of a coating element, an oxyhydroxide of a coating element, an oxycarbonate of a coating element, or a hydroxycarbonate of a coating element. The compound that forms the coating layer may be amorphous or crystalline. The coating element contained in the coating layer may be Mg, Al, Co, K, Na, Ca, Si, Ti, V, Sn, Ge, Ga, B, As, Zr, or a mixture thereof. The coating layer formation process may be any one of various coating methods (for example, spray coating or precipitating) that do not adversely affect properties of the positive active material when these elements are used with respect to the compounds. The coating layer formation process may be obvious to one of ordinary skill in the art and thus will not be described herein in detail.

Amounts of the positive active material, the conducting agent, the binder, and the solvent may be at the same levels as conventionally used in a lithium battery. Then, a separator that is to be interposed between the positive electrode and the negative electrode may be prepared. The separator may be any separator that is conventionally used in a lithium battery. For example, the separator may be a material that has a low resistance to migration of ions of an electrolyte and an excellent electrolyte-retaining capability. For example, the separator may include a material selected from the group consisting of glass fiber, polyester, polyethylene, polypropylene, polytetrafluoroethylene (PTFE), and a combination thereof, each of which may be nonwoven or woven. For example, a separator for use in a lithium ion battery may be a foldable separator formed of polyethylene or polypropylene, and a separator for use in a lithium ion polymer battery may be a separator having an excellent organic electrolyte retaining capability. An example of a method of manufacturing the separator will now be described in detail.

A separator composition may be prepared by mixing a polymer resin, a filler, and a solvent. The separator composition may be directly coated and dried on an electrode, thereby forming a separator. Alternatively, the separator composition may be cast and dried on a support as a film and then the separator film separated from the support may be laminated on an electrode, thereby forming a separator.

A polymer resin that is used to produce the separator may be any material that is used in a binder of an electrode plate. For example, the polymer resin may be a vinylidenefluoride/hexafluoropropylene copolymer, polyvinylidenefluoride (PVDF), polyacrylonitrile, polymethylmethacrylate, or a combination thereof.

Next, an electrolyte may be prepared. For example, the electrolyte may be an organic electrolyte. Also, the electrolyte may be solid. For example, the solid electrolyte may be boron oxide, lithium oxynitride, or the like, but is not limited thereto. For example, the solid electrolyte may be any one of various solid electrolytes that are used in the art. The solid electrolyte may be formed on the negative electrode by, for example, sputtering.

For example, an organic electrolyte may be prepared. The organic electrolyte may be prepared by dissolving a lithium salt in an organic solvent. The organic solvent may be any one of various organic solvents that are used in the art. For example, the organic solvent may be propylene carbonate, ethylene carbonate, fluoroethylene carbonate, butylene carbonate, dimethyl carbonate, diethyl carbonate, ethyl methyl carbonate (methylethyl carbonate), methyl n-propyl carbonate, ethyl n-propyl carbonate, methylisopropyl carbonate, di-n-propyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, or a mixture thereof.

The lithium salt may be any one of various lithium salts that are used in the art. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$(x and y are natural numbers), LiCl, LiI, or a mixture thereof may be used.

Figure 2:
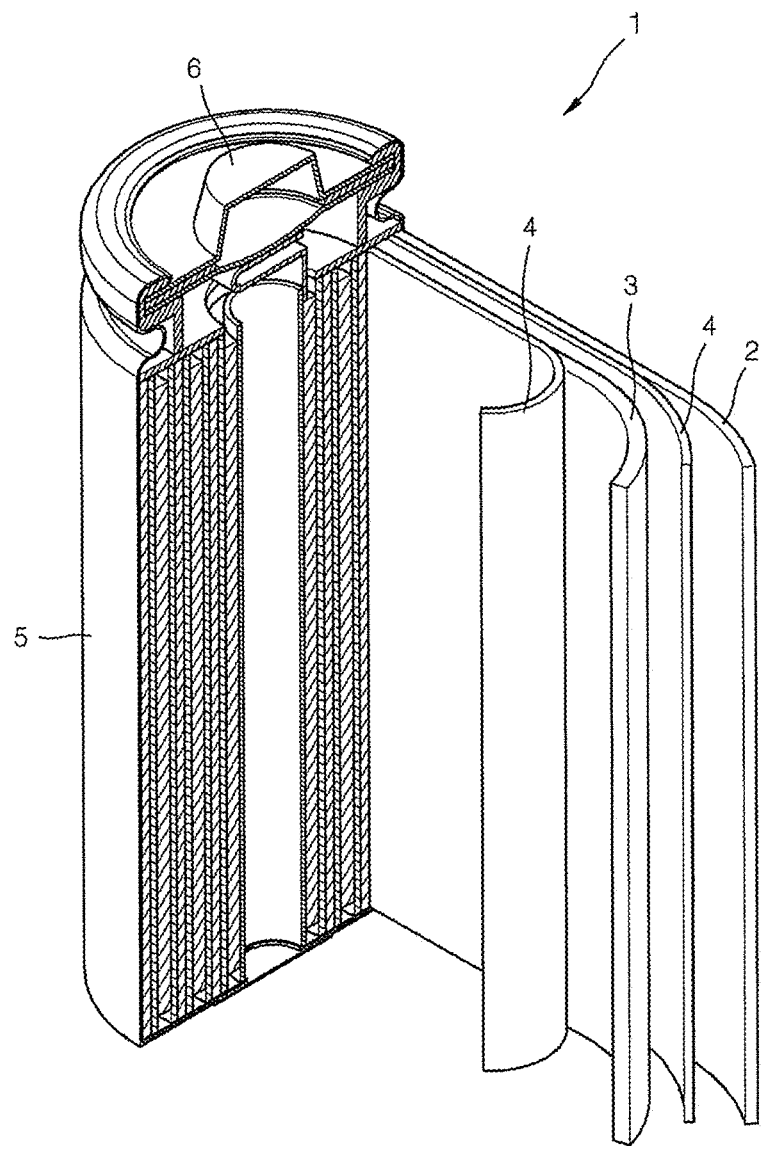
FIG. 2 is a schematic view of a lithium battery according to an embodiment of the present invention.

Referring to FIG. 2, a lithium battery 1 includes a positive electrode 3, a negative electrode 2, and a separator 4. The positive electrode 3, the negative electrode 2, and the separator 4 are wound or folded to be housed in a battery case 5. Subsequently, an electrolyte is loaded into the battery case 5 and then sealed with a cap assembly 6, thereby completing manufacture of the lithium battery 1. The battery case 5 may be cylindrical, rectangular, thin film-shaped, or the like. For example, the lithium battery 1 may be a large thin film-type battery. Alternatively, the lithium battery 1 may be a lithium ion battery.

The separator is disposed between the positive electrode plate and the negative electrode plate to form a battery assembly. A plurality of the battery assemblies are stacked in a bi-cell structure, and then impregnated with an electrolyte, and the obtained structure is housed in a pouch, followed by sealing, thereby completing manufacture of a lithium ion polymer battery.

Also, a plurality of the battery assemblies are stacked on each other to form a battery pack, and the battery pack may be used in various devices that require high capacity and high power output. For example, the battery pack may be used in a notebook computer, a smart phone, an electric vehicle, or the like.

Also, the lithium battery may be used in an electric vehicle (EV) due to its storage stability at high temperature, excellent lifetime characteristics, and high-rate characteristics. For example, the lithium battery may be used in hybrid vehicles, such as a plug-in hybrid electric vehicle (PHEV).

A capacitor according to an embodiment of the present invention includes a negative electrode including the electrode active material. For example, the capacitor may be a super capacitor having a very high power accumulation capacity.

The capacitor may employ the negative electrode including the electrode active material. The capacitor may be manufactured by disposing a separator between a positive electrode and a negative electrode, followed by injection of an electrolyte into the separator. The positive electrode herein may be any one of various electrodes that are used in the art.

The electrolyte may include a solvent and, as the solvent, at least one solvent selected from the group consisting of acetonitrile, dimethyl ketone, and propylene carbonate may be used. The electrolyte may include an alkali metal salt that has a solubility of 0.01 mole/L or more with respect to the solvent and that is electrically inactive in a working voltage range of the capacitor. Examples of the alkali metal salt are lithium perchlorate, lithium tetrafluoroborate, lithium hexafluorophosphate, etc. The electrolyte may further include additives for improving properties of the capacitor. For example, a stabilizer or a thickener may be used.

Also, the lithium battery and/or capacitor may include the electrode active material as a positive active material.

A method of preparing the electrode active material according to an embodiment of the present invention includes forming a carbon-based moiety represented by Formula 2 below on at least a portion of a surface of a core including at least one of a metal and a metal oxide that enable intercalation and deintercalation of lithium ions by mixing i) the core, ii) a carbon-based precursor represented by Formula 1 below, and iii) a solvent; and converting the carbon-based moiety into a crystalline carbon thin film by heating the core on which the carbon-based moiety is formed in an inert atmosphere.

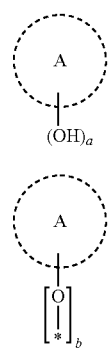

<Formula 1>

<Formula 2> wherein in Formulae 1 and 2,
ring A is a substituted or unsubstituted $C_5$-$C_{30}$ aromatic ring or a substituted or unsubstituted $C_2$-$C_{30}$ heteroaromatic ring,
a and b are each independently an integer of 1 to 5, and
* denotes a binding site with the surface of the core.

The detailed description about the core included in the mixture has been already presented above. The core may include a nano-structure as described above. For example, if the core having a nano-structure is in the form of a particle, the average particle size of the core having the nano-structure may be a nano-size as described above. Also, if the core having the nano-structure is in the form of a particle and has a pore and a skeleton that forms a wall between adjacent pores, the average particle size of the core, average particle size of the pore, and thickness of the skeleton may be nano-sizes as described above.

A method of manufacturing the core having pores according to an embodiment of the present invention may include impregnating silica ($SiO_2$), $Al_2O_3$, ZnO, MgO, carbon, or the like, which are used as a porous template, with a liquid including a precursor of the core; heating the porous template impregnated with the liquid including the core precursor to form a porous template-core composite; and removing the porous template from the porous template-core composite.

The porous template may have a nano-structure that is related to a target nano-structure of the core.

The core precursor may be a nitride, a chloride, a sulfide, a salt (for example, ammonium salt), a cyanide, an oxide, or an alkoxide, which are materials including the metal or oxide of the metal included in the core. For example, if the core includes $SnO_2$, the core precursor may be a salt including tin (for example, $Sn(NO_3)_2 \cdot 6H_2O$, $Sn(CH_3COO)_2 \cdot xH_2O$, etc.) and a chloride including tin (for example, $SnCl_2 \cdot xH_2O$, (wherein, x is an integer number and for example, $SnCl_2 \cdot 2H_2O$ (Tin(II) chloride dehydrate)) etc.), but is not limited thereto. Alternatively, if the core includes $MoO_2$, the core precursor may be salt including molybdenum (for example, $(NH_4)_8Mo_7O_{24} \cdot 4H_2O$ (Ammonium molybdate tetrahydrate)), but is not limited thereto.

The liquid including the core precursor may either be a melted product (for example, $SnCl_2 \cdot H_2O$ is used as a melted product) that is obtained by heating the core precursor or a solution that is obtained by dissolving the core precursor in a solvent, such as water, alcohol, or the like (for example, $(NH_4)_6Mo_7O_{24} \cdot 4H_2O$ is used by dissolving in water).

The heating temperature may be in a range of about 300° C. to about 700° C. For example, the heating temperature may be in a range of about 500° C. to about 550° C. If the heating temperature is within the ranges described above, crystallinity of the core in the porous template-core composite as the heated product may increase. The heating may be performed in an oxidizing atmosphere or a reducing atmosphere. The reducing atmosphere may be an atmosphere including at least one gas selected from the group consisting of nitrogen gas, argon gas, helium gas, and hydrogen gas. The oxidizing atmosphere may be an atmosphere including oxygen. For example, the oxidizing atmosphere may include air.

The removing of the porous template from the porous template-core composite may be performed by contacting the porous template-core composite with an etchant. For example, the etchant may be selected from the group consisting of a fluoric acid (HF), NaOH, and HF—$NH_4F$ (buffer), but is not limited thereto. The etchant may be an acid or a base.

The carbon-based precursor may include, as represented by Formula 1, an aromatic ring or heteroaromatic ring having a conjugation structure and one to five hydroxyl groups.

In Formula 1, the ring A may be a substituted or unsubstituted benzene, a substituted or unsubstituted pentalene, a substituted or unsubstituted indene, a substituted or unsubstituted naphthalene, a substituted or unsubstituted azulene, a substituted or unsubstituted heptalene, a substituted or unsubstituted indacene, a substituted or unsubstituted acenaphthylene, a substituted or unsubstituted fluorene, a substituted or unsubstituted phenalene, a substituted or unsubstituted phenanthrene, a substituted or unsubstituted anthracene, a substituted or unsubstituted fluoranthene, a substituted or unsubstituted triphenylene, a substituted or unsubstituted pyrene, a substituted or unsubstituted chrysene, a substituted or unsubstituted naphthacene, a substituted or unsubstituted picene, a substituted or unsubstituted perylene, a substituted or unsubstituted pentaphene, a substituted or unsubstituted hexacene, a substituted or unsubstituted pyrrole, a substituted or unsubstituted pyrazole, a substituted or unsubstituted imidazole, a substituted or unsubstituted imidazopyridine, a substituted or unsubstituted imidazopyrimidine, a substituted or unsubstituted pyridine, a substituted or unsubstituted pyrazine, a substituted or unsubstituted pyrimidine, a substituted or unsubstituted pyridazine, a substituted or unsubstituted indole, a substituted or unsubstituted purine, a substituted or unsubstituted quinoline, a substituted or unsubstituted phthalazine, a substituted or unsubstituted indole, a substituted or unsubstituted naphthyridine, a substituted or unsubstituted quinazoline, a substituted or unsubstituted cinnoline, a substituted or unsubstituted indazole, a substituted or unsubstituted carbazole, a substituted or unsubstituted phenazine, a substituted or unsubstituted phenanthridine, a substituted or unsubstituted triazine, a substituted or unsubstituted phenanthroline, or a substituted or unsubstituted quinoxaline, but is not limited thereto.

If the ring A is a substituted $C_5$-$C_{30}$ aromatic ring or a substituted or unsubstituted $C_2$-$C_{30}$ heteroaromatic ring, the substituent may be a halogen atom, a cyano group, a carboxylic group or a salt thereof, a $C_1$-$C_{10}$ alkyl group (for example, a methyl group, an ethyl group, a propyl group, a butyl group, or the like), or a $C_1$-$C_{10}$ alkoxy group (for example, a methoxy group, an ethoxy group, a propoxy group, a butoxy group, or the like), but is not limited thereto.

For example, the ring A may be a substituted or unsubstituted $C_5$-$C_{30}$ aromatic ring or a substituted or unsubstituted $C_2$-$C_{30}$ heteroaromatic ring, which is fused with only an unsubstituted 6-membered ring.

According to an embodiment of the present invention, in Formula 1, the ring A is benzene, naphthalene, phenalene, phenanthrene, anthracene, triphenylene, pyrene, chrysene, naphthacene, picene, perylene, pentaphene, hexacene, pyridine, pyrazine, pyrimidine, pyridazine, quinoline, phthalazine, quinoxaline, quinazoline, cinnoline, phenanthridine, phenanthroline, or phenazine, and a and b may each be 1 or 2, but is not limited thereto.

The solvent may be selected from typical solvents that do not chemically react with the core and carbon-based precursor, are removable at a relatively low temperature, and function as a medium that allows the core to effectively contact with the carbon-based precursor. The solvent may be acetone, ethanol, distilled water, or the like, but is not limited thereto.

As a result of contacting the core and the carbon-based precursor, the carbon-based moiety represented by Formula 2 may be bonded to the surface of the core. The carbon-based moiety may be formed by dehydration between a hydroxyl group that is present at the surface of the core and a hydroxyl group of the carbon-based precursor.

The bonding of the carbon-based moiety on the surface of the core may be performed by preparing the mixture described above. Alternatively, the bonding may be performed by heating that is performed to promote the dehydration between a hydroxyl group that is present at the surface of the core and a hydroxyl group of the carbon-based precursor. Heating conditions for promoting the dehydration may vary according to compositions and amounts of the core and the carbon-based precursor. For example, the heating may be performed in an inert atmosphere (for example, an atmosphere including at least one of nitrogen gas, argon gas, helium gas, and hydrogen gas) at a temperature of about 100° C. to about 500° C., and for 1 hour to 5 hours.

Subsequently, the core that has a surface to which the carbon-based moiety is bonded may be heated in a gaseous atmosphere (for example, an atmosphere including at least one of nitrogen gas, hydrogen gas, or inert gases such as argon gas or helium gas) to carbonate the carbon-based moiety of FIG. 2 bonded to the surface of the core, thereby converting the carbon-based moiety into a crystalline carbon thin film as described above. Thus, the preparation of the electrode active material including the core and the crystalline carbon thin film formed on at least a portion of the surface of the core may be completed.

Heating conditions for the core having a surface to which the carbon-based moiety is bonded may vary according to compositions and amounts of the core and the carbon-based precursor. For example, heating may be performed at a temperature of about 300° C. to about 600° C. (for example, about 400° C. to about 500° C.) for 1 hour to 5 hours (for example, 1 hour to 3 hours).

Because the carbon-based moiety on the surface of the core is bonded to the surface of the core while oxygen is interposed therebetween as confirmed by Formula 2, a self-assembled mono layer (SEM layer) that includes the carbon-based moiety of Formula 2 may be formed on the surface of the core. The SEM layer including the carbon-based moiety of Formula 2 is converted into a crystalline carbon thin film by heating and the crystalline carbon thin film of the electrode active material may be very thin (for example, 2 nm or less) or may have a uniform thickness. Accordingly, as illustrated in FIG. 1B, a crystalline carbon thin film 14 having a uniform thickness may be formed on an inner wall of a pore 16 that has a nano-size.

Also, because the crystalline carbon thin film is formed by heating the ring A of the carbon-based moiety of Formula 2 and the ring A is an aromatic or heteroaromatic ring having a conjugated structure, the crystalline carbon thin film may have excellent crystallinity. The electrode active material including the crystalline carbon thin film formed from the carbon-based precursor of Formula 1 may have excellent conductivity.

Also, because the ring A of the carbon-based moiety of Formula 2 is an aromatic or heteroaromatic ring having a conjugated structure, the heating temperature for the conversion into the crystalline carbon thin film is relatively low. Typically, the higher the temperature at which a carbon-based compound is converted into a carbon thin film, the higher crystallinity a formed carbon thin film may have. However, when an active material is exposed at high temperature, the crystal structure of the active material changes and the nano-structure of the active material may collapse (for example, pore collapse). For example, as confirmed in X-ray diffraction patterns (B and C of FIGS. 8 and 9) of active materials prepared according to Comparative Examples 6 and 7 (see below), once exposed to high temperature, pores included in the active material may collapse and the crystal structure of the active material may change. However, because the carbon-based precursor of Formula 1 has the ring A having a conjugated structure and at least one hydroxyl group that is bondable to the surface of the core, conversion into the carbon thin film having excellent crystallinity may be easily obtained at low temperature at which the nano-structure and crystal structure of the core do not change. By doing so, the electrode active material that maintains a nano-structure and has high conductivity may be obtained.

One or more embodiments will now be described in further detail with reference to the following examples. These examples are for illustrative purpose only and are not intended to limit the scope of the one or more embodiments.

EXAMPLE

Preparation of Active Material

Example 1

Figure 3:
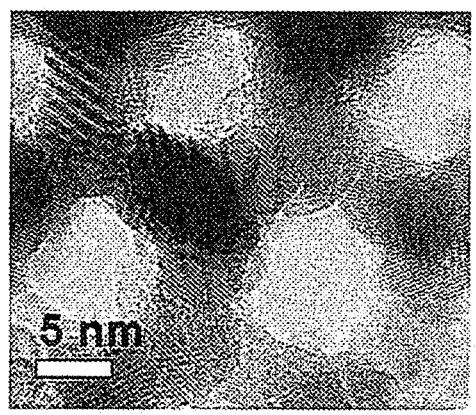
FIG. 3 shows a transmission electron microscope (TEM) image of an active material prepared according to Comparative Example 1.

$Sn(NO_3)_2 \cdot 6H_2O$ was melted by heating to prepare a $Sn(NO_3)_2 \cdot 6H_2O$ melted product, and the $Sn(NO_3)_2 \cdot 6H_2O$ melted product was loaded into a porous $SiO_2$(KIT-6, powder in which three-dimensional pores were connected to each other). In this case, the $Sn(NO_3)_2 \cdot 6H_2O$ melted product was loaded into the porous $SiO_2$ in such a way that the amount of $SnO_2$ was 40 parts by weight based on 100 parts by weight of $SiO_2$. Subsequently, the porous $SiO_2$ into which $Sn(NO_3)_2 \cdot 6H_2O$ was loaded was heated under an atmospheric condition at a temperature of 550° C. for 3 hours, thereby producing a $SiO_2$—$SnO_2$ composite. The composite was added to a 10 wt % HF aqueous solution and reacted for 10 minutes, and this adding and reacting process was performed again to remove the $SiO_2$ template, followed by filtering. As a result, a porous $SnO_2$ core having a skeleton having a thickness of about 7 nm as illustrated in FIG. 3 was obtained.

One g of the porous $SnO_2$ core, 0.02 g of 2,3-dihydroxynaphthalene (DN) as a carbon-based precursor, and 0.5 g of acetone as a solvent were mixed and stirred, and then the resultant mixture (the weight ratio of porous $SnO_2$ core to carbon-based precursor was 1:0.02) was first-heat treated in an $N_2$ atmosphere at a temperature of 200° C. for 2 hours to promote dehydration between the core and DN. Then, the temperature was increased to 500° C. and a second-heating was performed thereon at a temperature of 500° C. for 2 hours, thereby forming an active material in which a carbon thin film was formed on at least a portion of the surface of the porous $SnO_2$ core.

Example 2

An active material was prepared in the same manner as in Example 1, except that 0.04 g of the carbon-based precursor was used to adjust the weight ratio of the porous $SnO_2$ core to the carbon-based precursor to be 1:0.04.

Example 3

An active material was prepared in the same manner as in Example 1, except that 0.06 g of the carbon-based precursor was used to adjust the weight ratio of the porous $SnO_2$ core to the carbon-based precursor to be 1:0.06.

Example 4

An active material was prepared in the same manner as in Example 1, except that 0.08 g of the carbon-based precursor was used to adjust the weight ratio of the porous $SnO_2$ core to the carbon-based precursor to be 1:0.08.

Example 5

An active material was prepared in the same manner as in Example 3, except that instead of the porous $SnO_2$ core, a pore-free $SnO_2$ core being a spherical particle (product of Aldrich Co., Ltd., $SnO_2$ particles having an average particle size of about 100 nm or less) was used.

Example 6

An active material was prepared in the same manner as in Example 4, except that instead of the porous $SnO_2$ core, a pore-free $SnO_2$ core being a spherical particle (product of Aldrich Co., Ltd., $SnO_2$ particles having an average particle size of about 100 nm or less) was used.

Example 7

An active material was prepared in the same manner as in Example 1, except that a porous $MoO_2$ core that was prepared by using a $Mo(NO_3)_2 \cdot 6H_2O$ melted product instead of the $Sn(NO_3)_2 \cdot 6H_2O$ melted product, was used instead of the porous $SnO_2$ core.

Example 8

An active material was prepared in the same manner as in Example 2, except that a porous $MoO_2$ core that was prepared by using a $Mo(NO_3)_2 \cdot 6H_2O$ melted product instead of the $Sn(NO_3)_2 \cdot 6H_2O$ melted product, was used instead of the porous $SnO_2$ core.

Example 9

An active material was prepared in the same manner as in Example 3, except that a porous $MoO_2$ core that was prepared by using a Mo(NO$_3$)$_2$.6H$_2$O melted product instead of the Sn(NO$_3$)$_2$.6H$_2$O melted product, was used instead of the porous SnO$_2$ core.

Example 10

An active material was prepared in the same manner as in Example 4, except that a porous MoO$_2$ core that was prepared by using a Mo(NO$_3$)$_2$.6H$_2$O melted product instead of the Sn(NO$_3$)$_2$.6H$_2$O melted product, was used instead of the porous SnO$_2$ core.

Comparative Example 1

An active material including the porous SnO$_2$ core was prepared in the same manner as in Example 1, except that the carbon thin film forming process was not performed.

Comparative Example 2

An active material was prepared in the same manner as in Example 5, except that sucrose was used instead of 2,3-dihydroxynaphthalene.

Comparative Example 3

An active material was prepared in the same manner as in Example 5, except that sucrose was used instead of 2,3-dihydroxynaphthalene and the second heating temperature was 700° C.

Comparative Example 4

An active material powder was prepared in the same manner as in Example 5, except that sucrose was used instead of 2,3-dihydroxynaphthalene and the second heating temperature was 900° C.

Comparative Example 5

An active material was prepared in the same manner as in Example 3, except that sucrose was used instead of 2,3-dihydroxynaphthalene.

Comparative Example 6

An active material was prepared in the same manner as in Example 3, except that sucrose was used instead of 2,3-dihydroxynaphthalene and the second heating temperature was 700° C.

Comparative Example 7

An active material was prepared in the same manner as in Example 3, except that sucrose was used instead of 2,3-dihydroxynaphthalene and the second heating temperature was 900° C.

Comparative Example 8

An active material including the porous MoO$_2$ core was prepared in the same manner as in Example 7, except that the carbon thin film forming process was not performed.

The active materials prepared according to Examples 1 to 10 and Comparative Examples 1 to 8 are shown in Table 1 below:

TABLE 1

| | Core component | Core structure | Carbon-based thin film forming precursor | Core:film precursor weight ratio | Second heating temperature (° C.) |
|---|---|---|---|---|---|
| Example 1 | SnO$_2$ | porous | DN | 1:0.02 | 500 |
| Example 2 | SnO$_2$ | porous | DN | 1:0.04 | 500 |
| Example 3 | SnO$_2$ | porous | DN | 1:0.06 | 500 |
| Example 4 | SnO$_2$ | porous | DN | 1:0.08 | 500 |
| Example 5 | SnO$_2$ | bulk (no pore) | DN | 1:0.06 | 500 |
| Example 6 | SnO$_2$ | bulk (no pore) | DN | 1:0.08 | 500 |
| Example 7 | MoO$_2$ | porous | DN | 1:0.02 | 500 |
| Example 8 | MoO$_2$ | porous | DN | 1:0.04 | 500 |
| Example 9 | MoO$_2$ | porous | DN | 1:0.06 | 500 |
| Example 10 | MoO$_2$ | porous | DN | 1:0.08 | 500 |
| Comparative Example 1 | SnO$_2$ | porous | — | — | — |
| Comparative Example 2 | SnO$_2$ | bulk (no pore) | sucrose | 1:0.06 | 500 |
| Comparative Example 3 | SnO$_2$ | bulk (no pore) | sucrose | 1:0.06 | 700 |
| Comparative Example 4 | SnO$_2$ | bulk (no pore) | sucrose | 1:0.06 | 900 |
| Comparative Example 5 | SnO$_2$ | porous | sucrose | 1:0.06 | 500 |
| Comparative Example 6 | SnO$_2$ | porous | sucrose | 1:0.06 | 700 |
| Comparative Example 7 | SnO$_2$ | porous | sucrose | 1:0.06 | 900 |
| Comparative Example 8 | MoO$_2$ | porous | — | — | — |

Evaluation Example 1

Active Material Observation

Figure 4A:
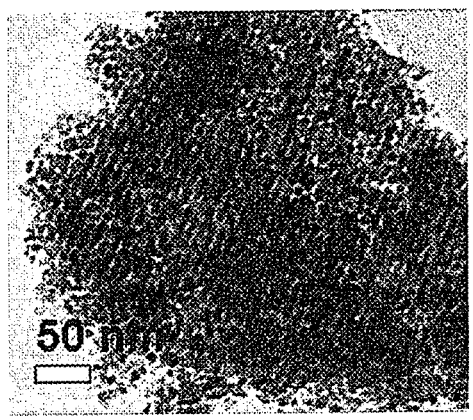
FIGS. 4A and 4B show TEM images of an active material prepared according to Example 3.
Figure 4B:
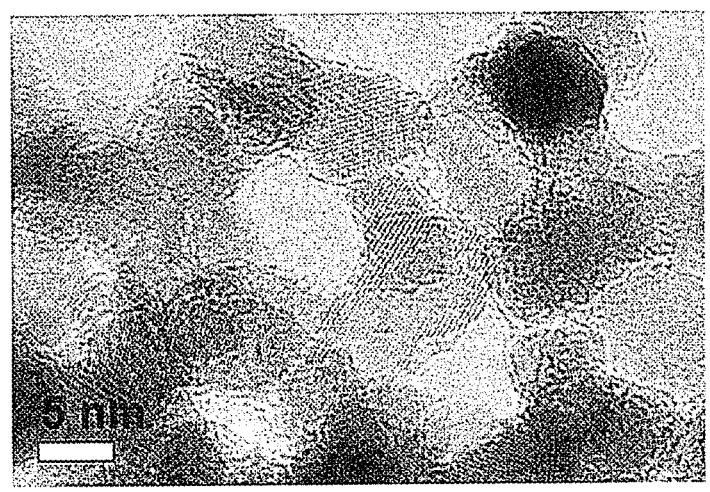
Figure 5A:
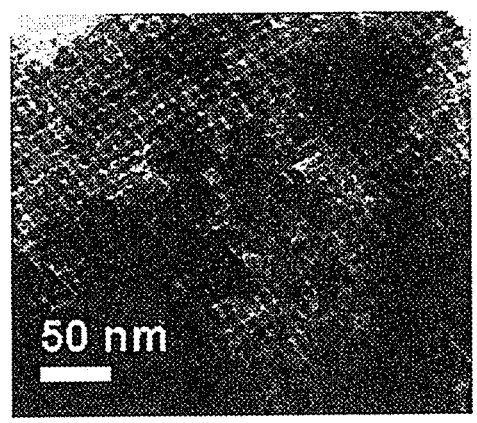
FIGS. 5A and 5B show TEM images of an active material prepared according to Example 4.
Figure 5B:
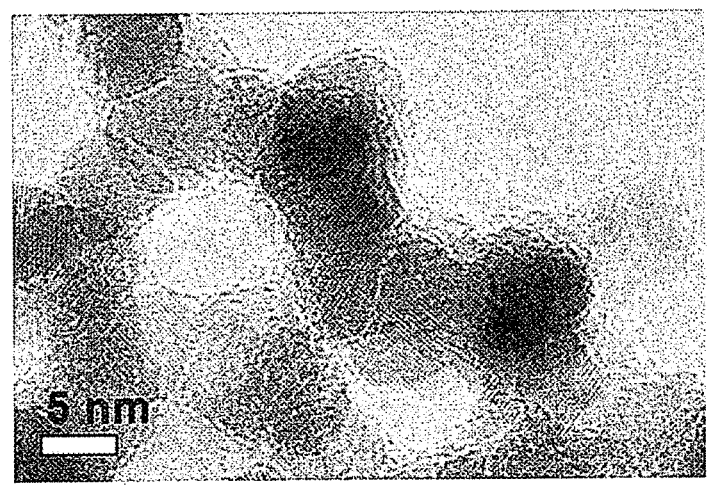
Figure 6:
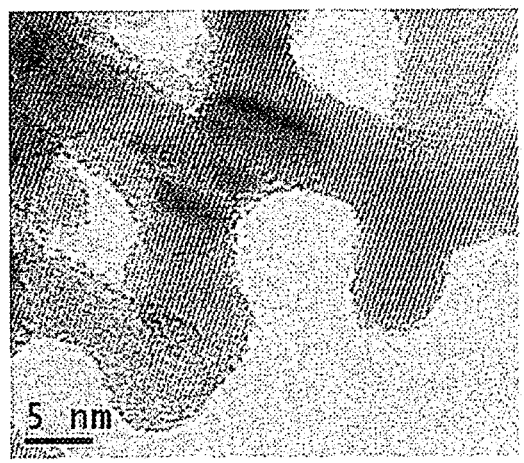
FIG. 6 shows a TEM image of an active material prepared according to Comparative Example 8.
Figure 7:
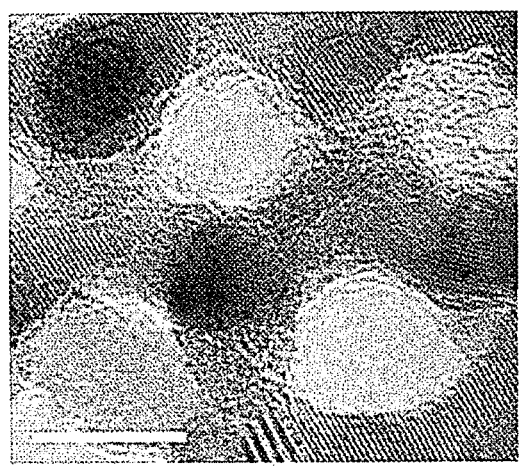
FIG. 7 shows a TEM image of an active material prepared according to Example 9.

The active materials of Comparative Example 1, Example 3, Example 4, Comparative Example 8, and Example 9 were analyzed by using a high-resolution transmission electron microscopy (HR-TEM), and results thereof are shown in FIG. 3 (active material of Comparative Example 1), FIGS. 4A and 4B (active material of Example 3), FIGS. 5A and 5B (active material of Example 4), FIG. 6 (active material of Comparative Example 8), and FIG. 7 (active material of Example 9), respectively.

Referring to FIGS. 3 to 7, it was confirmed that the active material powders had porous structures.

Referring to FIGS. 4B, 5B, and 7, it was confirmed that the active materials of Examples 3, 4, and 9 include nano-size pores that were orderly arranged to be connected to each other to form a channel. The thickness of the nano-skeleton that forms a wall between adjacent pores is shown in Table 2 below:

TABLE 2

| | Thickness of skeleton that forms a wall between adjacent pores [nm] |
|---|---|
| Example 3 | 7 ± 1 |
| Example 4 | 7 ± 1 |
| Example 9 | 7 ± 1 |

Evaluation Example 2

X-Ray Diffraction Test

Figure 8:
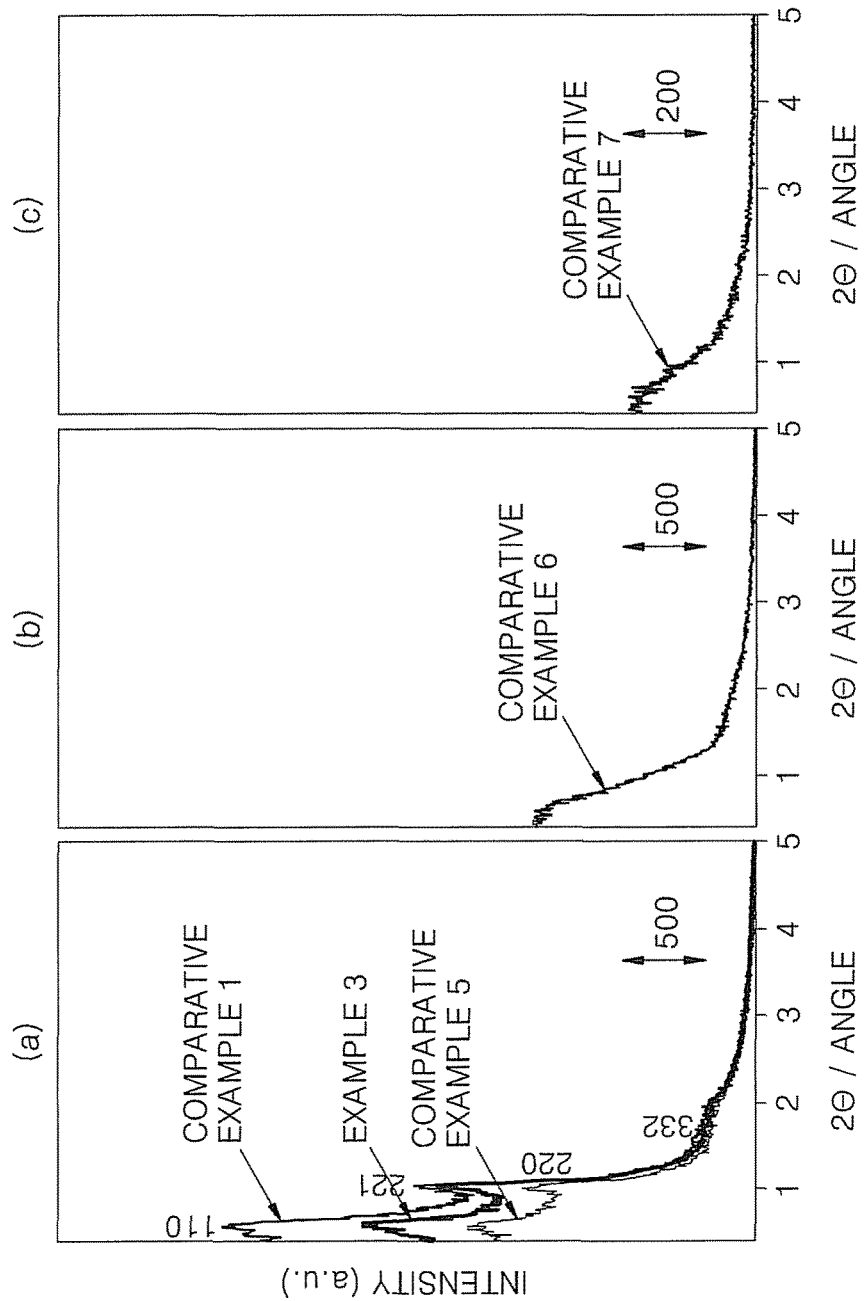
FIG. 8 shows low angle X-ray diffraction test results of active materials prepared according to Comparative Example 1, Example 3, and Comparative Examples 5 to 7.
Figure 9:
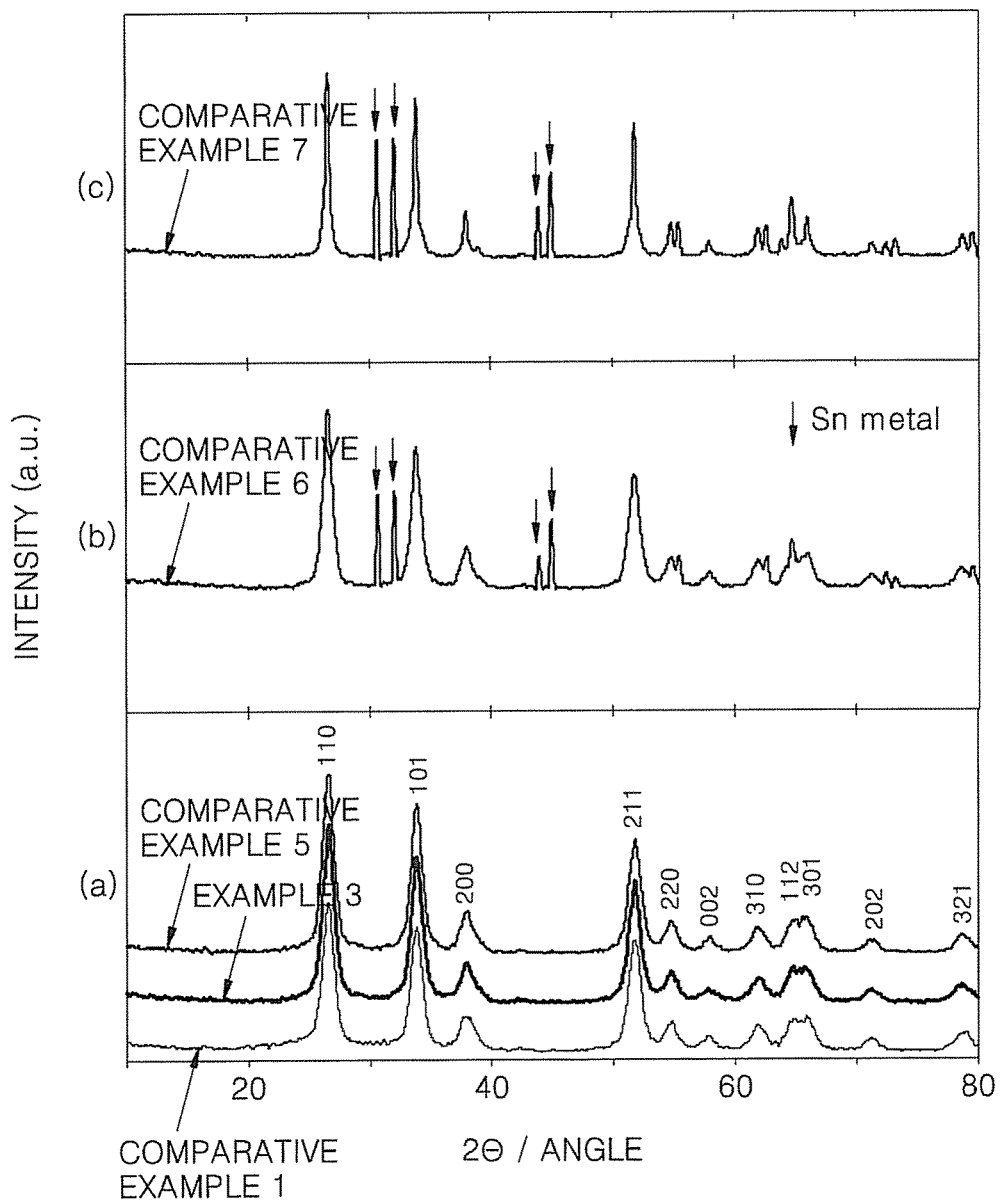
FIG. 9 shows high angle X-ray diffraction test results of active materials prepared according to Comparative Example 1, Example 3, and Comparative Examples 5 to 7.

An X-ray diffraction test was performed using CuKα on the active materials of Comparative Example 1, Example 3, and Comparative Examples 5 to 7, and low angle diffraction patterns and high angle diffraction patterns of the active materials are shown in FIGS. 8 and 9.

Referring to (a) of FIG. 8, peaks of the active materials of Comparative Example 1 (porous core/carbon thin film not formed), Example 3 in which heating was performed at a temperature of 500° C. (porous core/carbon thin film formed using DN), and Comparative Example 5 in which heating was performed at a temperature of 500° C. (porous core/carbon thin film formed using sucrose), all with respect to a (110) plane are present at a Bragg 2θ of 0.6±0.2°, and peaks thereof with respect to a (221) plane are present at a Bragg 2θ of 1.0±0.2°. The (110) plane and the (221) plane correspond to surfaces of a highly ordered three-dimensional skeleton and pore structure in the porous $SnO_2$. The low angle X-ray diffraction spectrum is a diffraction pattern formed by the ordered arrangement of the nano-sized skeleton and pore structure. Referring to (a) of FIG. 8, it was confirmed that the active materials of Comparative Example 1 (porous core/carbon thin film not formed), Example 3 in which heating was performed at a temperature of 500° C. (porous core/carbon thin film formed using DN), and Comparative Example 5, which heating was performed at a temperature of 500° C. (porous core/carbon thin film formed using sucrose) have mesoporous structures having ordered nano-size pores.

However, referring to (b) and (c) of FIG. 8, the peaks of the active materials of Comparative Example 6 in which heating was performed at a temperature of 700° C. (porous core/carbon thin film formed using sucrose) and Comparative Example 7 in which heating was performed at a temperature of 900° C. (porous core/carbon thin film formed using sucrose) with respect to the (110) plane and the (221) plane were not clear. From this result, it was confirmed that the active materials of Comparative Example 6 and Comparative Example 7 did not have the ordered mesoporous structure any more due to the collapse of a majority of the nano-structure of the porous $SnO_2$ core that had been present before the carbon thin film was formed using sucrose. The collapse of the nano-structure may be due to the high-temperature heating (700° C. and 900° C.) that is required to form the carbon thin film using sucrose.

Referring to (a) of FIG. 9, the active materials of Example 3 in which heating was performed at a temperature of 500° C. (porous core/carbon thin film formed using DN) and Comparative Example 5 in which heating was performed at a temperature of 500° C. (porous core/carbon thin film formed using sucrose) have peaks at the same Bragg 2θ as that of the active material of Comparative Example 1 (porous core/a carbon thin film was not formed). From this result, it is confirmed that the active materials of Example 3 in which heating was performed at a temperature of 500° C. (porous core/carbon thin film formed using DN) and Comparative Example 5 (porous core/carbon thin film formed using sucrose) may have the same crystal phase as that of the active material of Comparative Example 1 (porous core/carbon thin film not formed).

However, referring to (b) and (c) of FIG. 9, the active materials of Comparative Example 6 in which heating was performed at a temperature of 700° C. (porous core/carbon thin film formed using sucrose) and Comparative Example 7 in which heating was performed at a temperature of 900° C. (porous core/carbon thin film formed using sucrose) have peaks that are not present in (a) of FIG. 9 (see arrows of (b) and (c) of FIG. 9). From this result, it is confirmed that due to the high-temperature heating (700° C. and 900° C.) for forming a carbon thin film using sucrose, the crystal phase of the $SnO_2$ core of the active material of Comparative Example 6 and 7 was changed.

Figure 10:
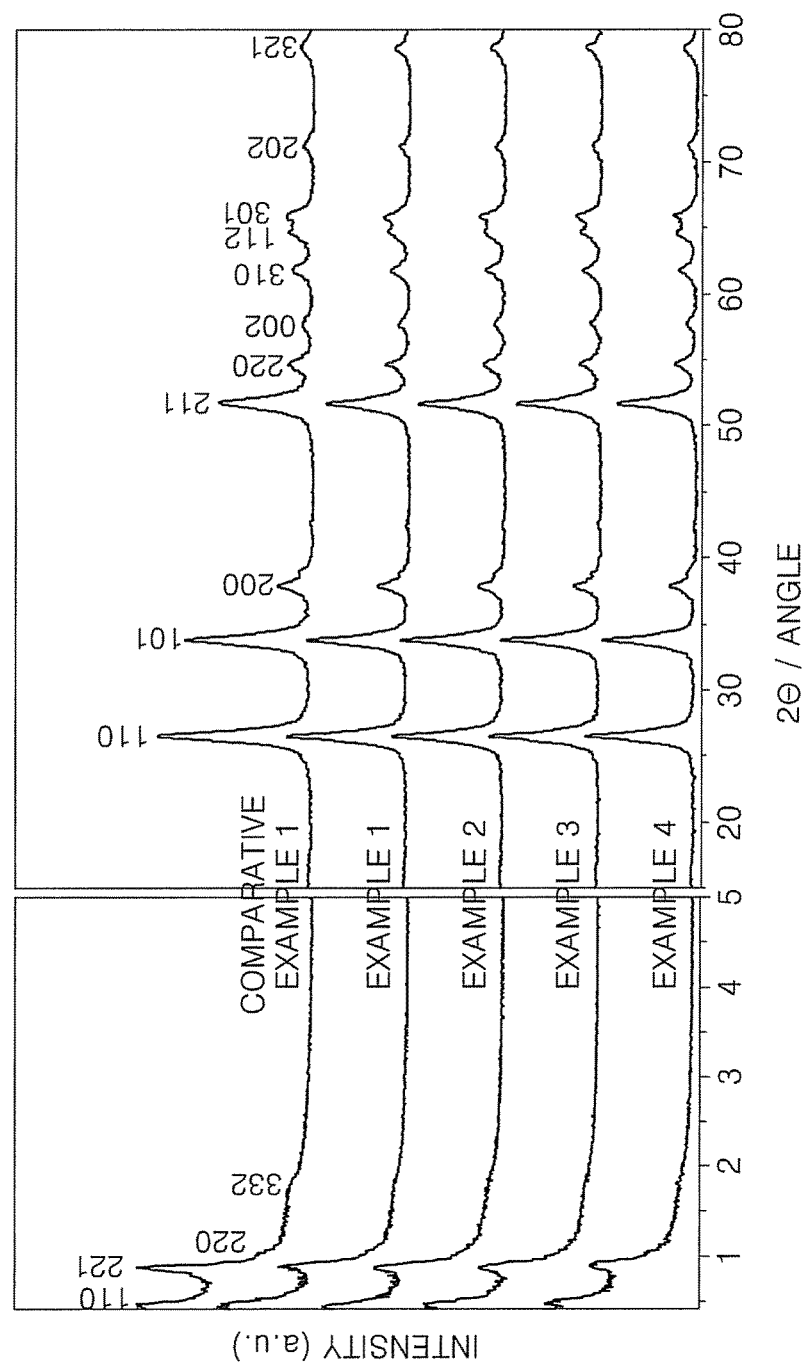
FIG. 10 shows X-ray diffraction test results of active materials prepared according to Comparative Example 1 and Examples 1 to 4.

FIG. 10 shows X-ray diffraction test results of the active materials of Comparative Example 1 and Examples 1 to 4. Referring to FIG. 10, the active materials of Examples 1 to 4 in which the carbon-based precursor was used in different amounts have the same X-ray diffraction pattern as the active material of Comparative Example 1. Accordingly, it was confirmed that the active materials of Examples 1 to 4 maintained their nano-porous structures even after the carbon thin film was formed.

Figure 11:
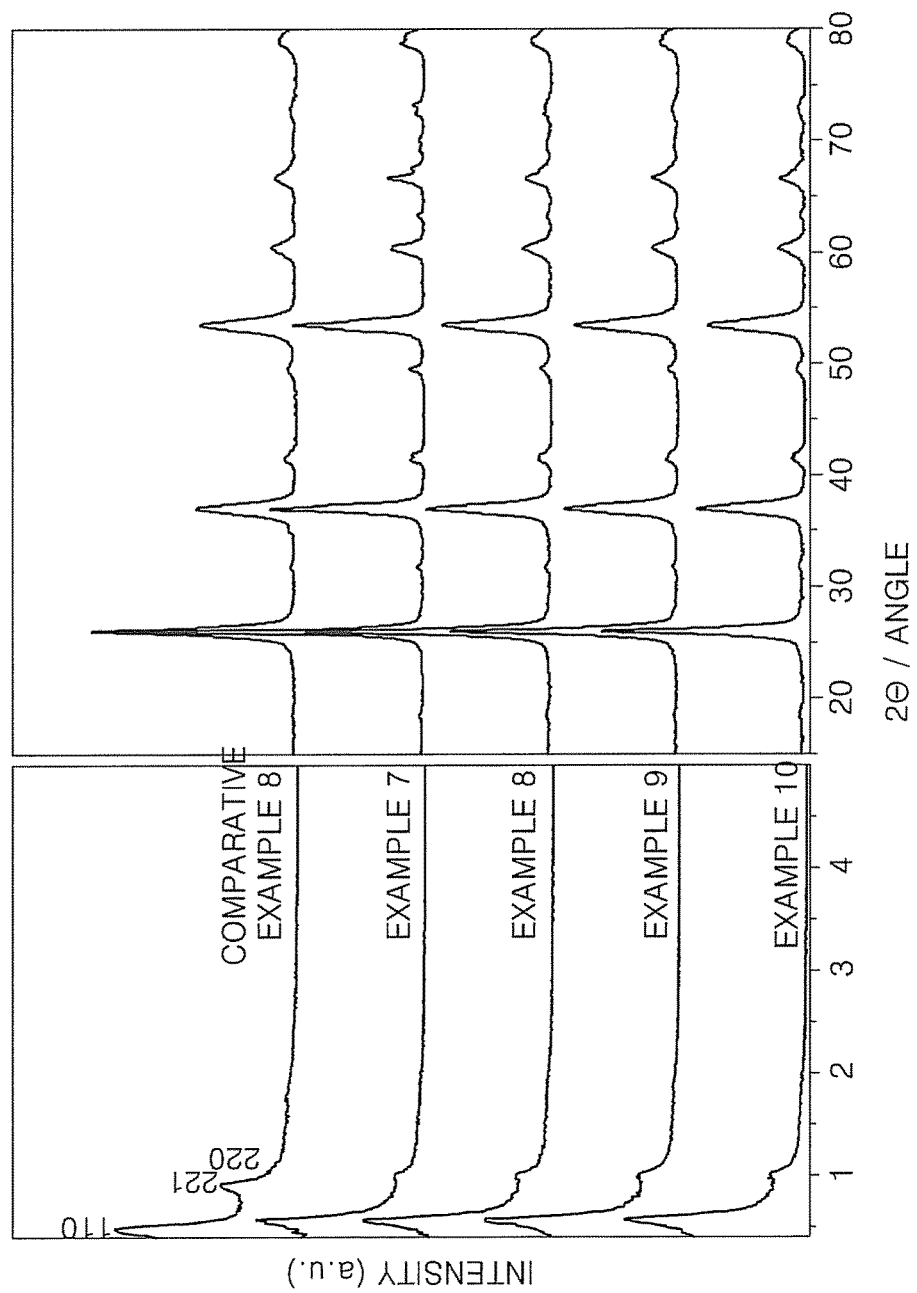
FIG. 11 shows X-ray diffraction test results of active materials prepared according to Comparative Example 8 and Examples 7 to 10.

FIG. 11 shows X-ray diffraction test results of the active materials of Comparative Example 8 and Examples 7 to 10. Referring to FIG. 11, the active materials of Examples 7 to 10 in which the carbon-based precursor was used in different amounts, have the same X-ray diffraction pattern as the active material of Comparative Example 8. Accordingly, it was confirmed that the active materials of Examples 7 to 10 maintained their nano-porous structures even after the carbon thin film was formed.

Evaluation Example 3

Nitrogen Adsorption Test

A nitrogen adsorption test was performed on the active materials of Comparative Example 1, Examples 1 to 4, Comparative Example 8, and Examples 7 to 10.

In the nitrogen adsorption test, nitrogen was adsorbed to or desorbed from the respective powder, and from the difference between the amount of the adsorbed nitrogen and the amount of the desorbed nitrogen, a specific surface area, a pore volume, and a pore size distribution were obtained. In detail, from an $N_2$ adsorption-desorption isotherm which was obtained by the nitrogen adsorption test, the specific surface area of a pore was calculated by using a Brunauer-Emmett-Teller (BET) method, the whole volume of the pore was directly deduced from the Y axis of the $N_2$ adsorption-desorption graph, and the pore size distribution was obtained by using the Barrett-Joyner-Halenda (BJH) method. The results thereof are shown in Table 3 below, FIG. 12 (the active materials of Comparative Example 1 and Examples 1 to 4), and FIG. 13 (the active materials of Comparative Example 8 and Examples 7 to 10):

TABLE 3

| | Core component | Specific surface area (m²/g) | Total pore volume (mL/g) | First pore peak (nm) | Second pore peak (nm) |
|---|---|---|---|---|---|
| Comparative Example 1 | $SnO_2$ | 112 | 0.25 | 2.9 | 15.6 |
| Example 1 | $SnO_2$ | 98 | 0.28 | 2.6 | 17.8 |
| Example 2 | $SnO_2$ | 107 | 0.28 | 2.5 | 17.9 |
| Example 3 | $SnO_2$ | 109 | 0.26 | 2.4 | 15.4 |
| Example 4 | $SnO_2$ | 97 | 0.25 | 2.4 | 15.4 |
| Comparative Example 8 | $MoO_2$ | 115 | 0.57 | 1.7 | 18.2 |
| Example 7 | $MoO_2$ | 118 | 0.46 | 1.7 | 17.6 |
| Example 8 | $MoO_2$ | 110 | 0.46 | 1.7 | 16.5 |
| Example 9 | $MoO_2$ | 91 | 0.47 | . | 16.5 |
| Example 10 | $MoO_2$ | 50 | 0.25 | . | 18.0 |

Figure 12:
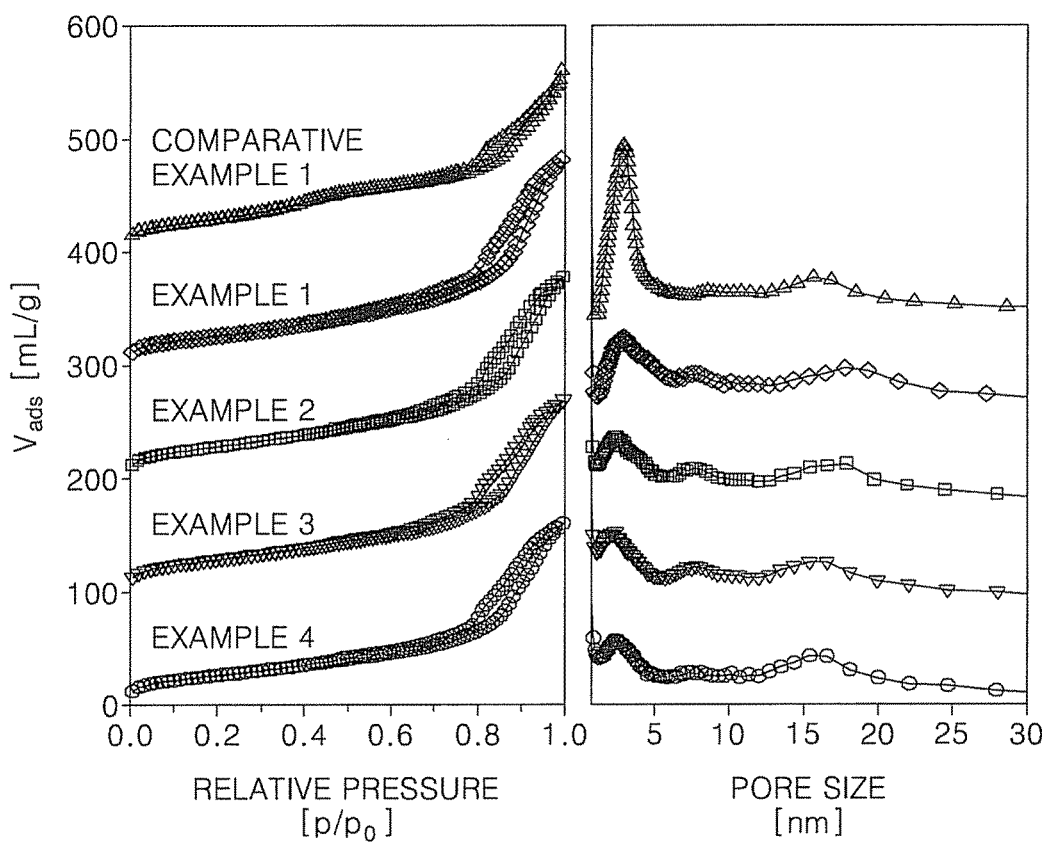
FIG. 12 shows a pore size distribution graph of active materials prepared according to Comparative Example 1 and Examples 1 to 4.
Figure 13:
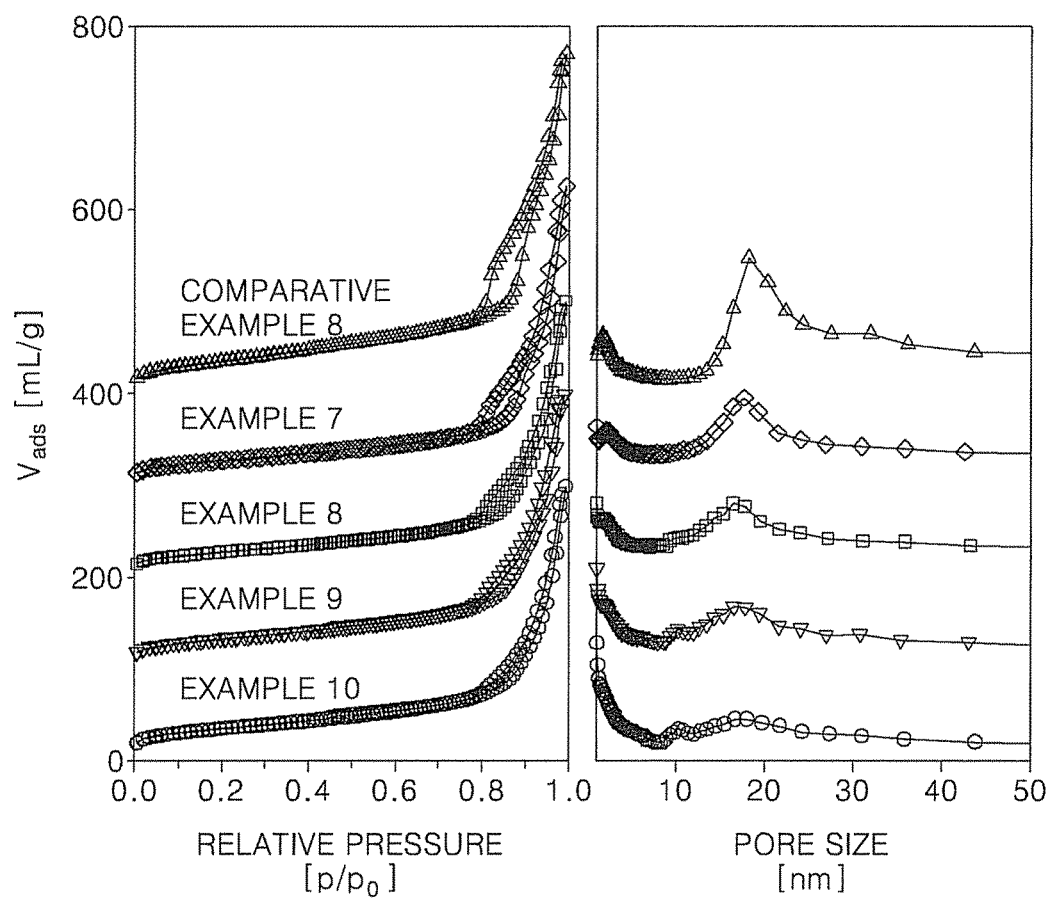
FIG. 13 shows a pore size distribution graph of active materials prepared according to Comparative Example 8 and Examples 7 to 10.

Referring to FIGS. 12 and 13, the active materials have bimodal size distributions having two pore diameter peaks (pore size distribution). Accordingly, it was confirmed that the active materials of Examples 1 to 4 and 7 to 10 maintain their nano-porous structures even after a carbon thin film was formed.

Evaluation Example 4

Raman Spectrum Evaluation

Figure 14:
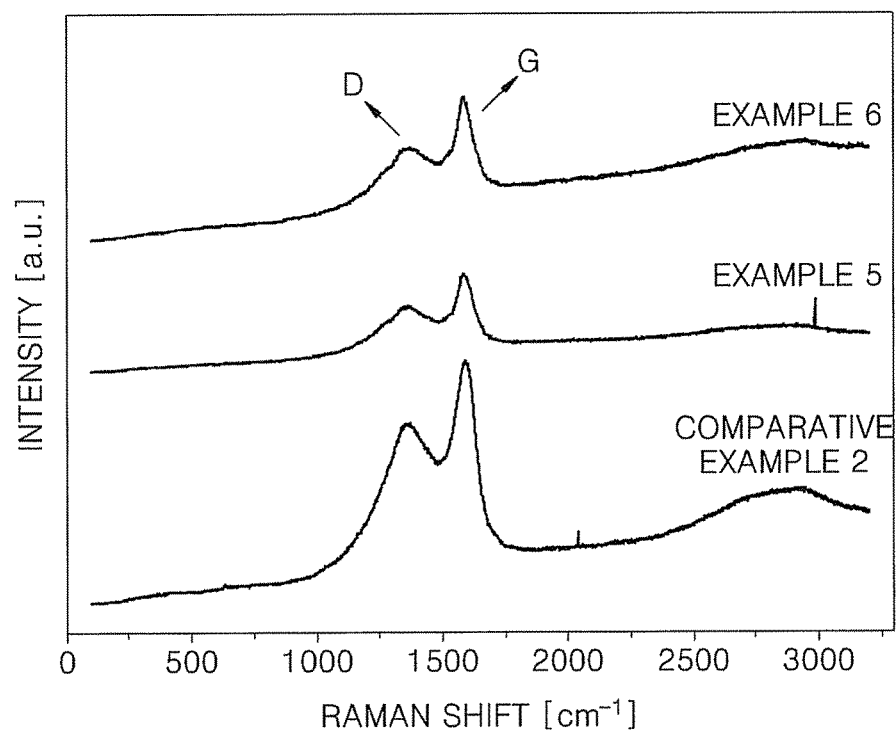
FIG. 14 shows Raman spectra of active materials prepared according to Comparative Example 2, and Examples 5 and 6.
Figure 15:
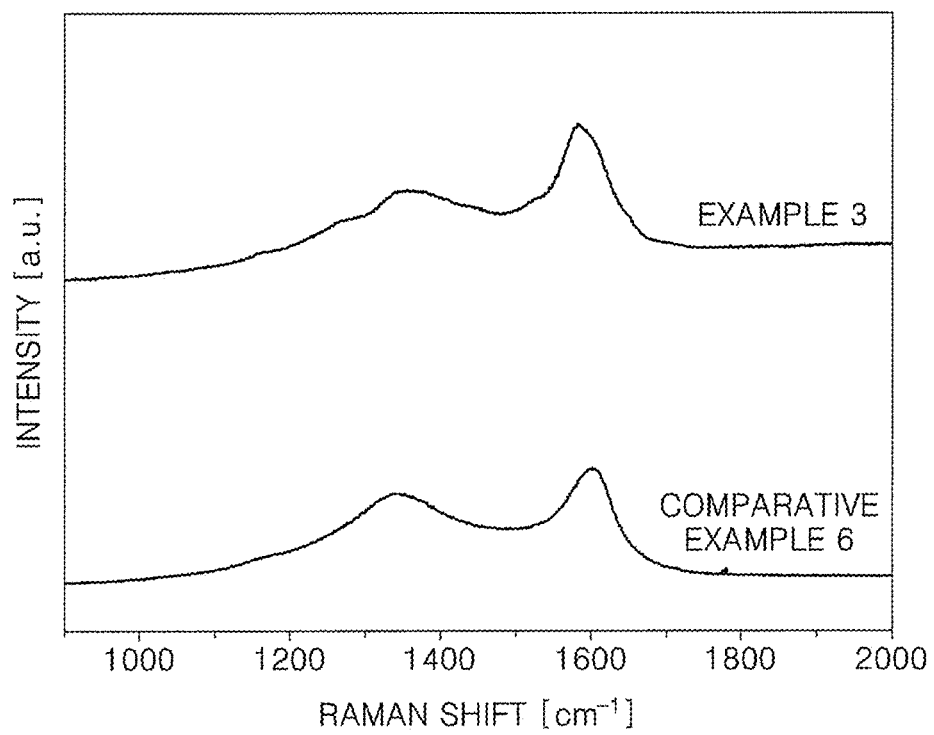
FIG. 15 shows Raman spectra of active materials prepared according to Example 3 and Comparative Example 6.

Raman spectra of the carbon thin films of the active materials of Comparative Example 2, Example 5, Example 6, Example 3, and Comparative Example 6 were evaluated, and results thereof are shown in Table 4 below and FIGS. 14 and 15.

TABLE 4

|  | Comparative Example 2 | Example 5 | Example 6 | Example 3 | Comparative Example 6 |
|---|---|---|---|---|---|
| Ratio of Peak D area/peak G area ($A_D/A_G$) | 1.95 | 1.81 | 1.59 | 1.64 | 2.27 |
| Ratio of Peak D intensity/peak G intensity ($I_D/I_G$) | 0.78 | 0.63 | 0.60 | 0.58 | 0.83 |

Referring to Table 4, $A_D/A_G$ and $I_D/I_G$ of Comparative Examples 2 and 6 are smaller than $A_D/A_G$ and $I_D/I_G$ of Examples 5, 6 and 3. Accordingly, it was confirmed that the carbon thin films of Examples 5, 6 and 3 have better crystallinity than the carbon thin films of Comparative Examples 2 and 6.

Evaluation Example 5

Differential Scanning Calorimetry Analysis

Figure 16:
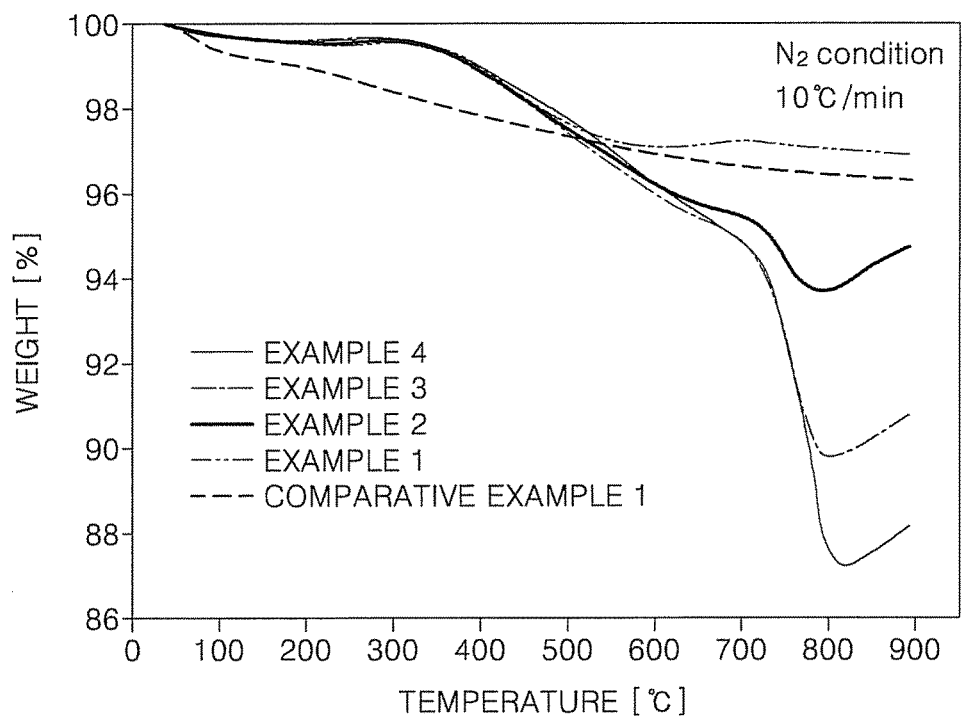
FIG. 16 shows thermogravimetric analysis (TGA) results of active materials prepared according to Comparative Example 1 and Examples 1 to 4.

A thermogravimetric analysis (TGA) was performed on the active materials of Comparative Example 1 and Examples 1 to 4 and results thereof are shown in FIG. 16. The TGA was performed using an SDT2960 manufactured by TA instruments Co., Ltd. Referring to FIG. 16, the mass decrease between 300° C. and 700° C. seems to correspond to a mass decrease of carbon (assuming that a mass decrease at a temperature of 300° C. or lower corresponds to a mass decrease of water and impurities and a mass decrease at a temperature of 700° C. or more corresponds to a mass decrease caused by phase transition in a reducing atmosphere at a high temperature). Accordingly, it was confirmed with reference to FIG. 16 that the active materials of Examples 1 to 4 include a carbon thin film.

Evaluation Example 6

Conductivity Evaluation

Figure 17:
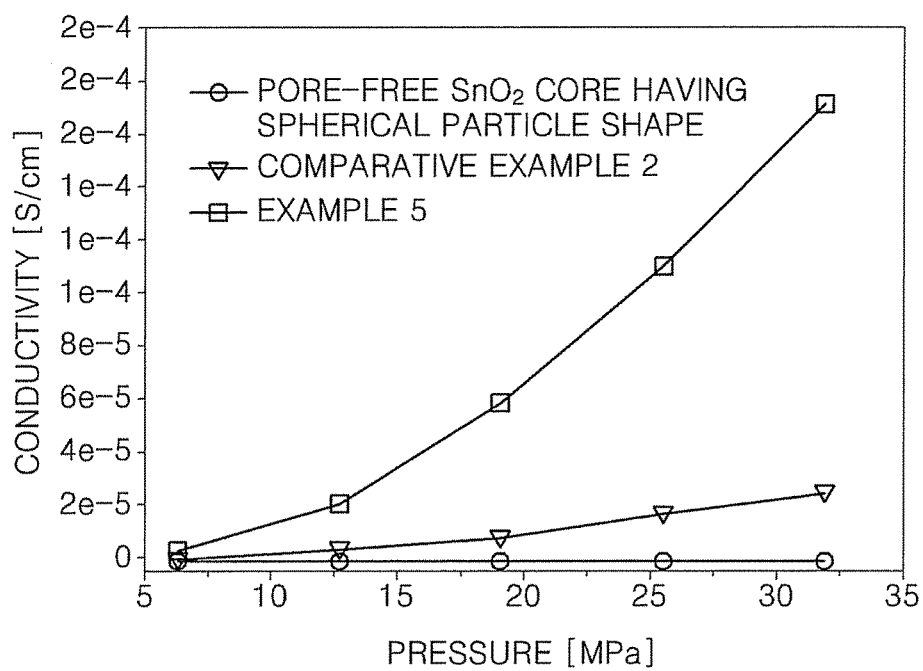
FIG. 17 shows conductivity data of a pore-free $SnO_2$ spherical core and active materials prepared according to Comparative Example 2 and Example 5.
Figure 18:
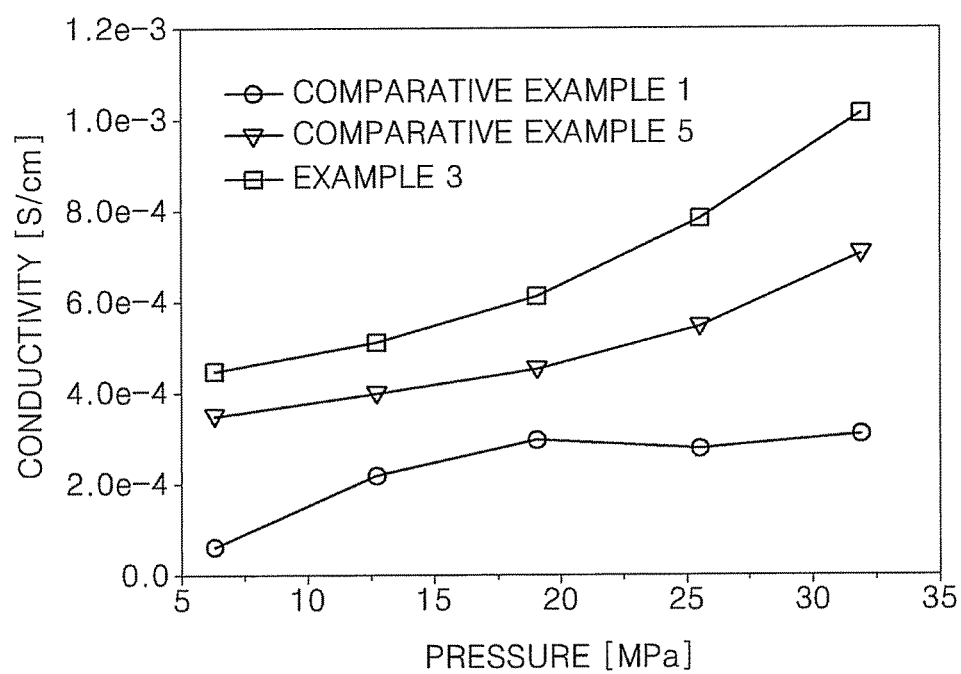
FIG. 18 shows conductivity data of active materials prepared according to Comparative Examples 1 and 5 and Example 3.

Conductivity of the active materials of pore-free $SnO_2$ core being a spherical particle (product of Aldrich Co., Ltd, $SnO_2$ particles having an average particle size of about 100 nm or less), Comparative Example 2, Example 5, Comparative Example 1, Comparative Example 5, and Example 3 were evaluated with respect to pressure by using a powder resistance measurement system LORESTA series (MCP-PD51), and results thereof are shown in FIGS. 17 and 18.

Referring to FIG. 17, it was confirmed that conductivity of the active material of Example 5 is higher than conductivity of the pore-free $SnO_2$ core being a spherical particle and the active material of Comparative Example 2.

Referring to FIG. 18, it was confirmed that conductivity of the active material of Example 3 is higher than conductivity of the active materials of Comparative Examples 1 and 5. From these results, it was confirmed that when a carbon thin film is formed, conductivity of the active material of Example 3 is improved while the nano-structure of the core is maintained.

Evaluation Example 7

Charge and Discharge Characteristics Evaluation (Manufacture of Negative Electrode and Lithium Battery)

70 mg of the active material powder of Comparative Example 1, 15 mg of a carbon conducting agent (Super-P, Timcal Inc.), and 15 mg of a binder (polyamide/imide, PAI) were mixed with 15 mL of N-methylpyrrolidone (NMP) in an agate mortar to prepare a slurry. The slurry was applied on a copper current collector to a thickness of about 50 μm by using a doctor blade, followed by drying at room temperature for 2 hours and then drying under a vacuum condition at a temperature of 200° C. for 2 hours to prepare a negative electrode plate.

A standard coin cell was manufactured using the negative electrode plate, lithium metal as a counter electrode, a polypropylene separator (Cellgard® 3510) as a separator, and a solution of 1.3 M $LiPF_6$ dissolved in a mixed solution including ethylene carbonate (EC) and diethyl carbonate (DEC)(3:7 weight ratio) as an electrolyte.

Coin cells were manufactured by using the same method, except that instead of the active material of Comparative Example 1, active materials of Examples 1 to 4, Comparative Example 8 and Examples 7 to 10 were used.

(Charge and Discharge Test)

Lithium batteries including the active materials of Comparative Example 1, Examples 1 to 4, Comparative Example 8 and Examples 7 to 10 were charged with a current of 100 mA per 1 g of the respective active materials until the voltage reached 0.001 V (vs. Li) and then, with the same amplitude of current, discharging was performed until the voltage reached 2 V (vs. Li). Consequentially, within the same current and voltage ranges, charging and discharging were repeatedly performed 100 times.

Figure 19:
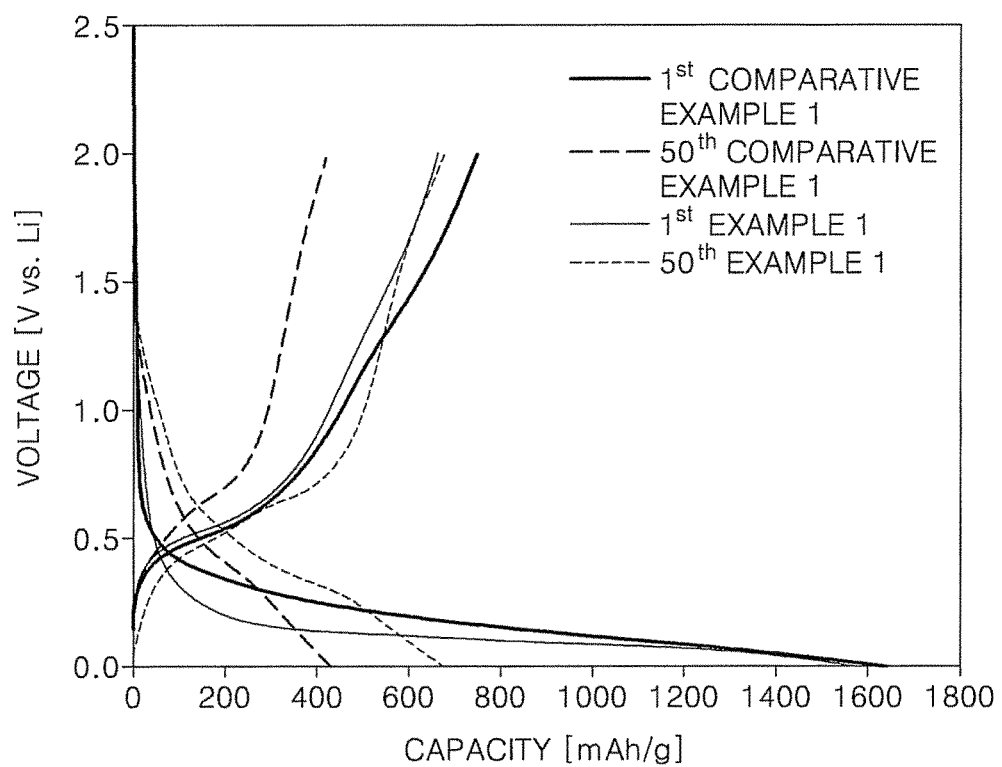
FIG. 19 shows a $1^{st}$ cycle charge and discharge curve and a $50^{th}$ cycle charge and discharge curve of a lithium battery including a negative electrode including respectively active materials prepared according to Comparative Example 1 and Example 3.
Figure 20:
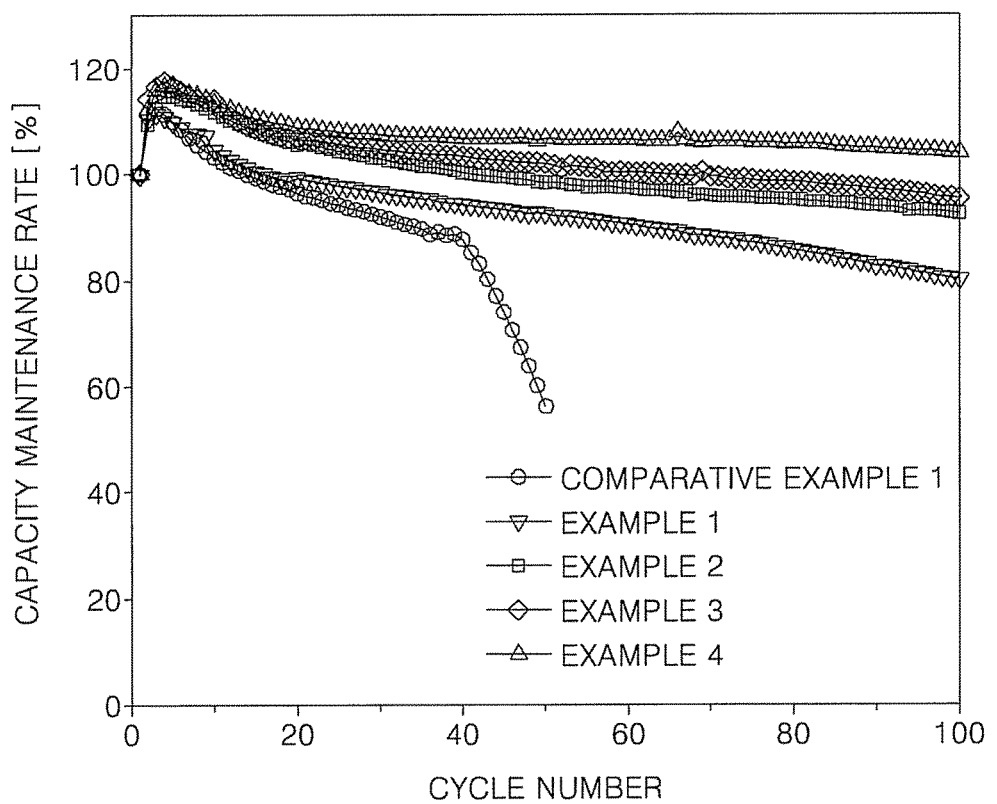
FIG. 20 is a graph of a capacity maintenance rate (%) of a lithium battery including a negative electrode including respectively active materials prepared according to Comparative Example 1 and Examples 1 to 4.
Figure 21:
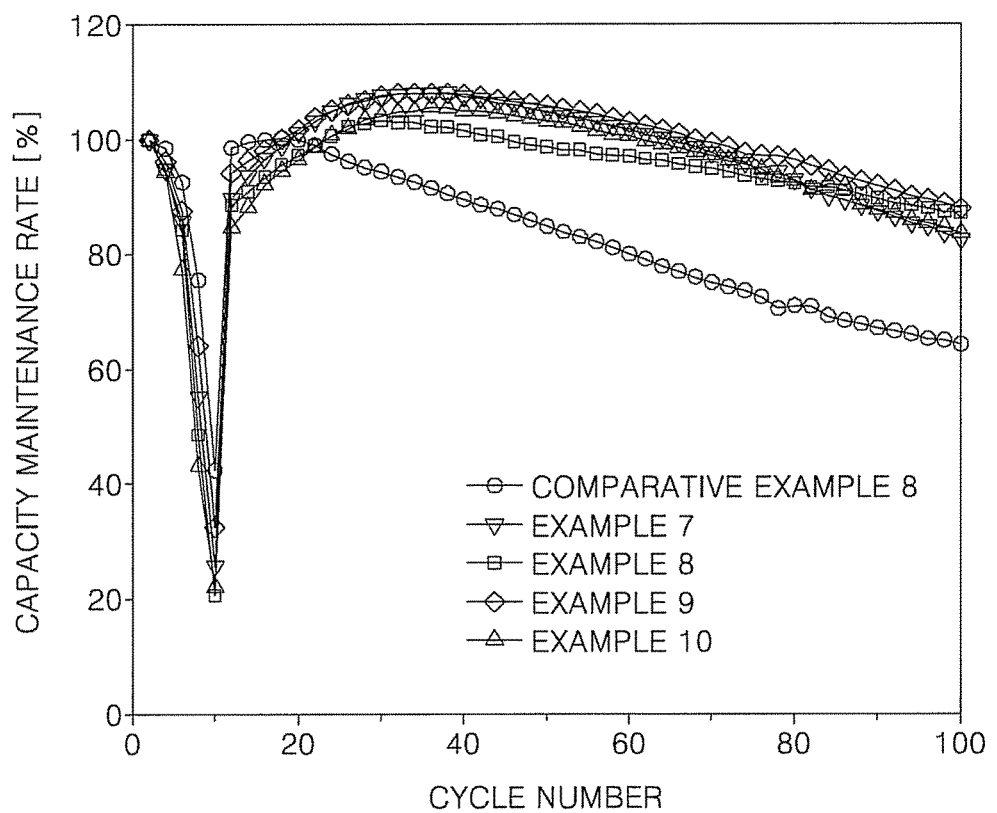
FIG. 21 is a graph of a capacity maintenance rate (%) of a lithium battery including a negative electrode including respectively active materials prepared according to Comparative Example 8 and Examples 7 to 10.

FIG. 19 shows charge and discharge results of the lithium batteries including the active materials respectively of Comparative Example 1 and Example 3 in the first and fifth cycles. FIG. 20 is a graph of a capacity maintenance rate of the lithium batteries including respectively the active materials of Comparative Example 1 and Examples 1 to 4. FIG. 21 is a graph of a capacity maintenance rate of the lithium batteries including the active materials respectively of Comparative Example 8 and Examples 7 to 10. The capacity maintenance rates (%) of FIGS. 20 and 21 were calculated by an equation "(discharge capacity after the respective cycles/initial discharge capacity)×100."

Also, the density of the negative electrode, capacity per g, capacity per cc, an initial efficiency, and 100 cycle lifetime ([discharge capacity after 100 cycles/initial discharge capacity]×100(%)) of each of the lithium batteries including the active materials of Comparative Example 1, Examples 1 to 4, Comparative Example 8, and Examples 7 to 10 are shown in Table 5 below. However, in Table 5, in the case of the lithium battery including the active material of Comparative Example 1, a 50 cycle lifetime ([discharge capacity after 50 cycles/initial discharge capacity]×100(%)) is shown.

TABLE 5

| | Negative active material | | | | |
|---|---|---|---|---|---|
| | Density ($g/m^2$) | Capacity per g (mAh/g) | Capacity per CC (mAh/CC) | Initial efficiency (%) | 100 cycle lifetime (%) |
| Comparative Example 1 | 1.89 | 751.2 | 925.6 | 46.31 | 56.1 (50 cycle lifetime) |
| Example 1 | 1.94 | 743.3 | 1048.4 | 45.84 | 80.9 |
| Example 2 | 2.10 | 693.1 | 1126.6 | 42.14 | 92.6 |
| Example 3 | 2.09 | 662.5 | 973.2 | 42.07 | 95.4 |
| Example 4 | 2.32 | 672.4 | 1092.9 | 40.72 | 103.9 |
| Comparative Example 6 | 1.58 | 1207.28 | 1332.37 | 68.86 | 64.30 |
| Example 7 | 1.63 | 1106.16 | 1264.48 | 69.51 | 82.50 |
| Example 8 | 1.55 | 1064.27 | 1154.63 | 68.59 | 87.20 |
| Example 9 | 1.52 | 1038.76 | 1102.79 | 70.07 | 87.87 |
| Example 10 | 1.57 | 1014.84 | 1114.23 | 68.25 | 83.65 |

Referring to FIGS. 20 and 21 and Table 5, it is confirmed that the lithium batteries including the negative electrodes including the active materials of Examples 1 to 4 and Examples 7 to 10 have better capacity and lifetime characteristics than the lithium batteries including the negative electrodes including the active materials of Comparative Example 1 and 8.

As described above, according to the one or more of the above embodiments of the present invention, lithium batteries including the electrode active materials show excellent capacity and lifetime characteristics.

It should be understood that the exemplary embodiments described therein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode active material comprising:
    a core comprising at least one of a metal and a metal oxide which enable intercalation and deintercalation of lithium ions;
    a crystalline carbon thin film that is formed on at least a portion of a surface of the core; and
    the electrode active material has a nano-structure, wherein the core comprises pores and a skeleton that forms a wall between adjacent pores, the electrode active material has a bimodal pore size distribution, the crystalline carbon thin film is formed on an exposed surface of the core and an inner wall of the pore by forming a carbon-based moiety represented by Formula 2 below and converting the carbon-based moiety into the crystalline carbon thin film having a thickness of 2 nanometers or less,
    wherein the metal comprises at least one of tin (Sn), iron (Fe), cobalt (Co), nickel (Ni), zinc (Zn), manganese (Mn), molybdenum (Mo), and bismuth (Bi), and the metal oxide comprises at least one of tin oxide, iron oxide, cobalt oxide, nickel oxide, zinc oxide, manganese oxide, molybdenum oxide, and bismuth oxide:

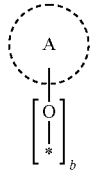

<Formula 2> wherein ring A is benzene, naphthalene, phenalene, phenanthrene, anthracene, triphenylene, pyrene, chrysene, naphthacene, picene, perylene, pentaphene, hexacene, pyridine, pyrazine, pyrimidine, pyridazine, quinoline, phthalazine, quinoxaline, quinazoline, cinnoline, phenanthridine, phenanthroline, or phenazine;
    b is an integer of 1 to 5; and
    * denotes a binding site with the surface of the core.

2. The electrode active material of claim 1, wherein the electrode active material is in the form of a particle, rod, wire, or tube.

3. The electrode active material of claim 1, wherein the pores are connected to each other to form a channel.

4. The electrode active material of claim 1, wherein the core comprises at least one of $SnO_2$ and $MoO_2$.

5. The electrode active material of claim 1, wherein the peak intensity ratio of $I_D/I_G$ is 0.7 or lower, wherein in a Raman spectrum of the crystalline carbon thin film, $I_D$ represents an intensity of peak D that is present at a wave number of $1360\pm10$ $cm^{-1}$ and $I_G$ represents an intensity of peak G that is present at a wave number of $1580\pm10$ $cm^{-1}$.

6. The electrode active material of claim 1, wherein a powder resistance value of the electrode active material at 31.83 Mpa is in a range of about $2.0\times10^{-5}$ S/cm to about $1.0\times10^{-2}$ S/cm.

7. The electrode active material of claim 1, wherein B/A is $7.69\times10^{-3}$ $g^2/m^2$ or less, A represents a specific surface area of the core, and B represents a mass of the carbon thin film.

8. The electrode active material of claim 1, wherein a specific surface area of the electrode active material is in a range of about 50 $m^2/g$ to about 250 $m^2/g$.

9. An electrode comprising the electrode active material of claim 1.

10. A lithium battery comprising the electrode of claim 9.

11. A lithium battery of claim 10, wherein the electrode is a negative electrode.

12. A method of preparing the electrode active material of claim 1, the method comprising:
    forming a carbon-based moiety represented by Formula 2 below on at least a portion of a surface of a core including at least one of a metal and a metal oxide that enable intercalation and deintercalation of lithium ions by mixing i) the core, ii) a carbon-based precursor represented by Formula 1 below, and iii) a solvent; and
    converting the carbon-based moiety into a crystalline carbon thin film having a thickness of 2 nm or less by heating in an inert atmosphere the core on which the carbon-based moiety is formed,

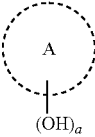

<Formula 1>

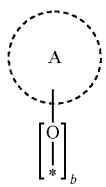
<Formula 2> in Formulae 1 and 2, the ring A is benzene, naphthalene, phenalene, phenanthrene, anthracene, triphenylene, pyrene, chrysene, naphthacene, picene, perylene, pentaphene, hexacene, pyridine, pyrazine, pyrimidine, pyridazine, quinoline, phthalazine, quinoxaline, quinazoline, cinnoline, phenanthridine, phenanthroline, or phenazine;

a and b are each independently an integer of 1 to 5; and

* denotes a binding site with the surface of the core, wherein the metal comprises at least one of tin (Sn), iron (Fe), cobalt (Co), nickel (Ni), zinc (Zn), manganese (Mn), molybdenum (Mo), and bismuth (Bi), and the metal oxide comprises at least one of tin oxide, iron oxide, cobalt oxide, nickel oxide, zinc oxide, manganese oxide, molybdenum oxide, and bismuth oxide.

13. The method of claim 12, wherein a and b each are 1 or 2.

14. The method of claim 12, wherein the forming of the carbon-based moiety on at least a portion of the surface of the core further comprises heating at a temperature of about 100° C. to about 500° C. for about 1 hour to about 5 hours to promote dehydration between a hydroxyl group at the core surface and a hydroxyl group of the carbon-based precursor.

15. The method of claim 12, wherein the heating of the core on which the carbon-based moiety is formed, is performed at a temperature of about 300° C. to about 600° C. for about 1 hour to about 5 hours.

16. The electrode active material of claim 1, wherein the thickness of the crystalline carbon thin film is smaller than the thickness of the skeleton.

17. The electrode active material of claim 1, wherein the carbon-based moiety is 2,3-dihydroxynaphthalene.

18. The electrode active material of claim 1, wherein the carbon-based moiety is formed using a carbon-based precursor represented by Formula 1 below

<Formual 1> wherein the ring A is a substituted or unsubstituted $C_5$-$C_{30}$ aromatic ring or a substituted or unsubstituted $C_2$-$C_{30}$ heteroaromatic ring; and a is an integer of 1 to 5.

* * * * *